US012754858B2

(12) United States Patent
Lee et al.

(10) Patent No.: US 12,754,858 B2
(45) Date of Patent: Oct. 6, 2026

(54) MEMORY DEVICE, MEMORY SYSTEM INCLUDING THE MEMORY DEVICE, AND OPERATING METHOD OF THE MEMORY SYSTEM

(71) Applicant: Samsung Electronics Co., Ltd., Suwon-si (KR)

(72) Inventors: Won Jae Lee, Suwon-si (KR); Ho Jin Nam, Suwon-si (KR); Jin In So, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 19/070,897

(22) Filed: Mar. 5, 2025

(65) Prior Publication Data

US 2026/0119415 A1 Apr. 30, 2026

(30) Foreign Application Priority Data

Oct. 29, 2024 (KR) ........................ 10-2024-0149426

(51) Int. Cl.
*G06F 13/16* (2006.01)
*G06F 13/40* (2006.01)
*G06F 13/42* (2006.01)

(52) U.S. Cl.
CPC ...... *G06F 13/1642* (2013.01); *G06F 13/4022* (2013.01); *G06F 13/4282* (2013.01)

(58) Field of Classification Search
CPC ............. G06F 13/1642; G06F 13/4022; G06F 13/4282; Y02D 10/00
See application file for complete search history.

(56) References Cited

U.S. PATENT DOCUMENTS 12,360,903 B2 * 7/2025 Kaseridis ............ G06F 12/0828
12,399,642 B2 * 8/2025 Zhang .................. G06F 3/0649
(Continued)

FOREIGN PATENT DOCUMENTS

KR 102573085 B1 8/2023

OTHER PUBLICATIONS

Extended European Search Report for European Application No. 25168222.5, dated Sep. 5, 2025.
[No Author Listed], Chapter 8—Control and Status Registers in book Compute Express Link (CXL) 1-15 Specification 3.2. Oct. 2, 2024;Revision 3.2(1):499-799.
Das Sharma et al., An introduction to the compute express link (cxl) interconnect. arXiv e-prints. Jun. 2023:arXiv-2306:1-36.
(Continued)

*Primary Examiner* — Tim T Vo
(74) *Attorney, Agent, or Firm* — Wolf, Greenfield & Sacks, P.C.

(57) ABSTRACT

There is provided a memory device including a memory controller with reduced power consumption. The memory device includes a first volatile memory including a first logical memory device and a CXL memory controller that controls operations of the first volatile memory and receive requests for the first volatile memory from a host through a CXL interface including a CXL switch. The CXL memory controller includes a coarse-grained global counter configured to count a number of requests received store a count value, a global hotness monitor configured to determine, based on respective ones of the count values, whether each memory unit is a hot unit or a cold unit, a hotness tracker controller configured to generate a first bitmap and a first hotness tracker configured to determine, based on the first bitmap, whether data stored in each of the plurality of segments included in the first logical memory device is hot.

20 Claims, 27 Drawing Sheets

(56) References Cited

U.S. PATENT DOCUMENTS

| | | | | |
|---|---|---|---|---|
| 12,399,811 | B2 * | 8/2025 | Price | G06F 12/0815 |
| 12,517,824 | B2 * | 1/2026 | Kang | G06F 12/0246 |
| 2017/0060476 | A1 | 3/2017 | Chinnakkonda Vidyapoornachary et al. | |
| 2018/0276139 | A1 | 9/2018 | Wysoczanski et al. | |
| 2022/0004495 | A1 | 1/2022 | Natarajan et al. | |
| 2022/0318040 | A1 | 10/2022 | White et al. | |
| 2023/0044342 | A1 | 2/2023 | Wilkinson | |
| 2023/0114414 | A1 | 4/2023 | Seyedzadehdelcheh et al. | |
| 2023/0376427 | A1 | 11/2023 | Oh et al. | |
| 2024/0119001 | A1 | 4/2024 | Song et al. | |
| 2024/0168848 | A1 * | 5/2024 | Park | G06F 11/008 |
| 2025/0383920 | A1 * | 12/2025 | Daglis | G06F 9/5016 |

OTHER PUBLICATIONS

Duraisamy et al., Towards an Adaptable Systems Architecture for Memory Tiering at Warehouse Scale. InProceedings of the 28th ACM International Conference on Architectural Support for Programming Languages and Operating Systems (ASPLOS), Mar. 25-29, 2023:727-41.

Rajadnya et al., CMS: Hotness Tracking Requirements. Oct. 17, 2023. Open Computer Overview, Oct. 17, 2023;1:1-11.

Sha et al., Hardware-software Collaborative Tiered-memory Management Framework for Virtualization. ACM Trans. Comput. Syst., Feb. 13, 2024;42(1-2):1-32.

Zhou et al., Toward CXL-Native Memory Tiering via Device-Side Profiling. ArXiv:2403.18702v1, Mar. 27, 2024;15 pages.

* cited by examiner

FIG. 14

| ID | Global Count Value | Hot Segment Count Value | |
|---|---|---|---|
| Unit1 | 31516 | 1248 | ⇐ Hot |
| Unit2 | 947 | 7 | |
| Unit3 | 225 | 0 | ⇐ Cold |
| Unit4 | 154 | 0 | ⇐ Cold |

⟨Bitmap of MLD1⟩

100A

100B

100C

1000

MEMORY DEVICE, MEMORY SYSTEM INCLUDING THE MEMORY DEVICE, AND OPERATING METHOD OF THE MEMORY SYSTEM

CROSS-REFERENCE TO RELATED APPLICATION

This application claims priority from Korean Patent Application No. 10-2024-0149426 filed on Oct. 29, 2024, in the Korean Intellectual Property Office, and all the benefits accruing therefrom under 35 U.S.C. 119, the contents of which in its entirety are herein incorporated by reference.

BACKGROUND

The present disclosure relates to a memory device, a memory system including the memory device, and an operating method of the memory system.

With advancements in technologies such as artificial intelligence (AI), big data, and edge computing, there is a growing demand for devices to process larger amounts of data more quickly. That is, high-bandwidth applications performing complex computations require faster data processing and more efficient memory access.

However, host devices, including computational devices such as CPUs and GPUs, are mostly connected to semiconductor devices containing memory via the PCIe protocol. As a result, they face limitations such as relatively low bandwidth, high latency, and issues related to memory sharing and consistency with the semiconductor devices. To address these limitations, the Compute Express Link (CXL) interface, which provides a low-latency and high-bandwidth link, is being utilized.

Meanwhile, when data stored in a CXL memory device communicating with a host via the CXL interface is frequently accessed by the host, a feature called CXL memory hotness tracking can be provided to migrate such data to the double data rate (DDR) memory of the host.

SUMMARY

A technical problem to be solved by the present disclosure is to provide a memory device including a memory controller with reduced power consumption.

Another technical problem to be solved by the present disclosure is to provide a memory system including a memory controller with reduced power consumption.

Yet another technical problem to be solved by the present disclosure is to provide an operating method of a memory system including a memory controller with reduced power consumption.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to some embodiments of the present disclosure, there is provided a memory device comprising a first volatile memory including a first logical memory device and a CXL memory controller configured to control operations of the first volatile memory and receive requests for the first volatile memory from a host through a CXL interface including a CXL switch, wherein the first logical memory device includes a plurality of segments that are physically separated from one another, at least two of the plurality of segments form a single memory unit among a plurality of memory units of the first logical memory device, and the CXL memory controller includes a coarse-grained global counter configured to count a number of the requests received for each of the plurality of memory units of the first logical memory device and store count values respectively associated with the number of the requests received for each of the plurality of memory units, a global hotness monitor configured to determine, based on respective ones of the count values, whether each of the plurality of memory units of the first logical memory device is a hot unit or a cold unit, a hotness tracker controller configured to generate a first bitmap for each of the plurality of memory units of the first logical memory device based on results of a determination of the global hotness monitor, and a first hotness tracker configured to determine, based on the first bitmap, whether data stored in each of the plurality of segments included in the first logical memory device is hot.

According to some embodiments of the present disclosure, there is provided a memory system comprising a host, a first CXL memory device including a first volatile memory that includes a first logical memory device, and a first CXL memory controller that is configured to control operations of the first volatile memory and a CXL switch configured to provide an interface between the host and the first CXL memory device, wherein the host is configured to transmit first requests for the first volatile memory through the CXL switch, the first logical memory device includes a plurality of segments that are physically separated from one another, at least two of the plurality of segments form a single memory unit among a plurality of memory units of the first logical memory device, the CXL switch includes a coarse-grained global counter configured to count a number of the first requests received for each of the plurality of memory units of the first logical memory device and store count values respectively associated with the number of the first requests received for each of the plurality of memory units, a global hotness monitor configured to determine, based on respective ones of the count values, whether each of the plurality of memory units of the first logical memory device is a hot unit or a cold unit, and a hotness tracker controller configured to generate a first bitmap for each of the plurality of memory units of the first logical memory device based on results of the determination of the global hotness monitor, and the first CXL memory controller is configured to determine, based on the first bitmap, whether data stored in each of the plurality of segments included in the first logical memory device is hot, using a first hotness tracker.

According to some embodiments of the present disclosure, there is provided an operating method of a memory system, comprising providing a memory system including a host, a volatile memory that includes a logical memory device, a CXL memory controller that is configured to control operations of the volatile memory, and a CXL switch that is configured to provide an interface between the host and the CXL memory controller, transmitting, by the host, requests for the volatile memory to the CXL memory controller through the CXL switch, counting, by a coarse-grained global counter, a number of the requests received for each of a plurality of memory units of the logical memory device and storing count values respectively associated with the number of the requests received for each of the plurality of memory units, determining, by a global hotness monitor, whether each of the plurality of memory units of the logical memory device is a hot unit or a cold unit based on respective ones of the count values, generating, by a hotness tracker controller, a bitmap for each of the plurality of memory units of the logical memory device based on results of the determination of the global hotness monitor and determining, by a hotness tracker, whether data stored in each of a plurality of segments included in the logical memory device is hot based on the bitmap, wherein each of the plurality of memory units includes at least two of the plurality of segments.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail example embodiments thereof with reference to the attached drawings, in which:

FIGS. 13 through 15 are diagrams illustrating the operation of the hotness tracker controller according to some embodiments.

DETAILED DESCRIPTION

A memory device, a memory system, and an operating method of the memory system according to some embodiments will hereinafter be described with reference to the accompanying drawings.

Figure 1:
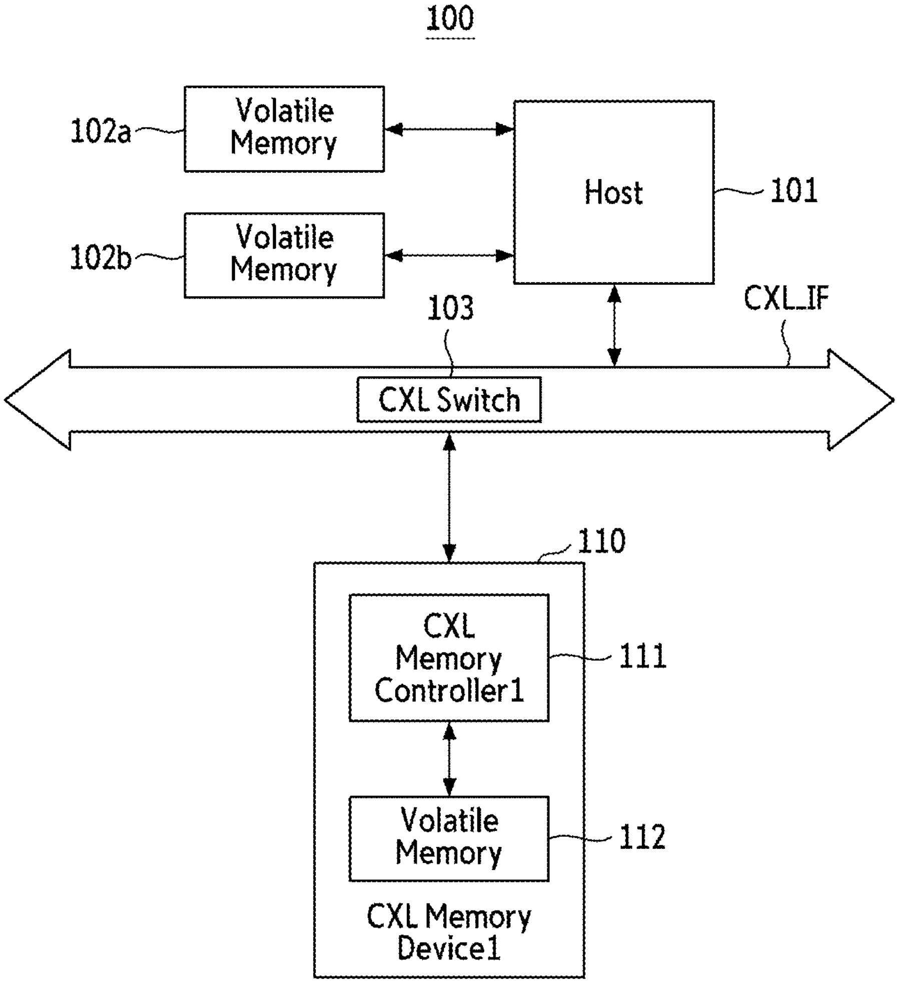
FIG. 1 is a is an example diagram illustrating a memory system according to some embodiments.

FIG. 1 is an example diagram illustrating a memory system according to some embodiments.

Referring to FIG. 1, a memory system 100 may include a host 101, a Compute Express Link (CXL) memory device 110, volatile memories 102*a* and 102*b*, and a CXL switch 103.

In some embodiments, the memory system 100 may be included in user devices such as a personal computer, laptop computer, server, media player, or digital camera, or in automotive devices such as a navigation system, black box, or in-vehicle electronic device. In some embodiments, the memory system 100 may be a mobile system such as a mobile phone, smartphone, tablet personal computer, wearable device, healthcare device, or internet of things (IoT) device.

The host 101 may control various operations of the memory system 100. In some embodiments, the host 101 may be one of various processors such as a central processing unit (CPU), graphics processing unit (GPU), neural processing unit (NPU), or data processing unit (DPU). In some embodiments, the host 101 may include a single-core processor or a multi-core processor.

The volatile memories 102*a* and 102*b* may be used as the main memory or system memory of the memory system 100. The volatile memories 102*a* and 102*b* may be connected to the host 101. In some embodiments, each of the volatile memories 102*a* and 102*b* may be a dynamic random-access memory (DRAM) device and may have a dual in-line memory module (DIMM) form factor, but the present disclosure is not limited thereto. In some embodiments, the volatile memories 102*a* and 102*b* may be implemented as non-volatile memories (NVMs) such as flash memory, phase-change random-access memory (PRAM), resistive random-access memory (RRAM), or magnetic random-access memory (MRAM).

The volatile memories 102*a* and 102*b* may communicate directly with the host 101 via a double data rate (DDR) interface. In some embodiments, the host 101 may include a memory controller configured to control each of the volatile memories 102*a* and 102*b*, but the present disclosure is not limited thereto. That is, the volatile memories 102*a* and 102*b* may communicate with the host 101 through various interfaces.

The CXL memory device 110 may include a CXL memory controller 111 and a volatile memory 112. The CXL memory controller 111 may store data in the volatile memory 112 or transmit data stored in the volatile memory 112 to the host 101 under the control of the host 101. In some embodiments, the volatile memory 112 may be a DRAM device and may have a DIMM form factor, but the present disclosure is not limited thereto.

In some embodiments, the host 101 and the CXL memory device 110 may communicate with each other through a CXL interface provided by the CXL switch 103. In some embodiments, the CXL interface may support dynamic protocol multiplexing of coherency, memory access, and input/output (IO) protocols, enabling low-latency and high-bandwidth links for various connections between accelerators, memory devices, or other electronic devices.

That is, in the memory system 100, the host 101 may communicate with the volatile memories 102*a* and 102*b* and the CXL memory device 110 via different interfaces, respectively. In this case, data frequently accessed by the host 101 may be stored in the volatile memories 102*a* and 102*b*, and data less frequently accessed by the host 101 may be stored in the CXL memory device 110. As such, the memory system 100 may include a hierarchical memory structure.

Figure 2:
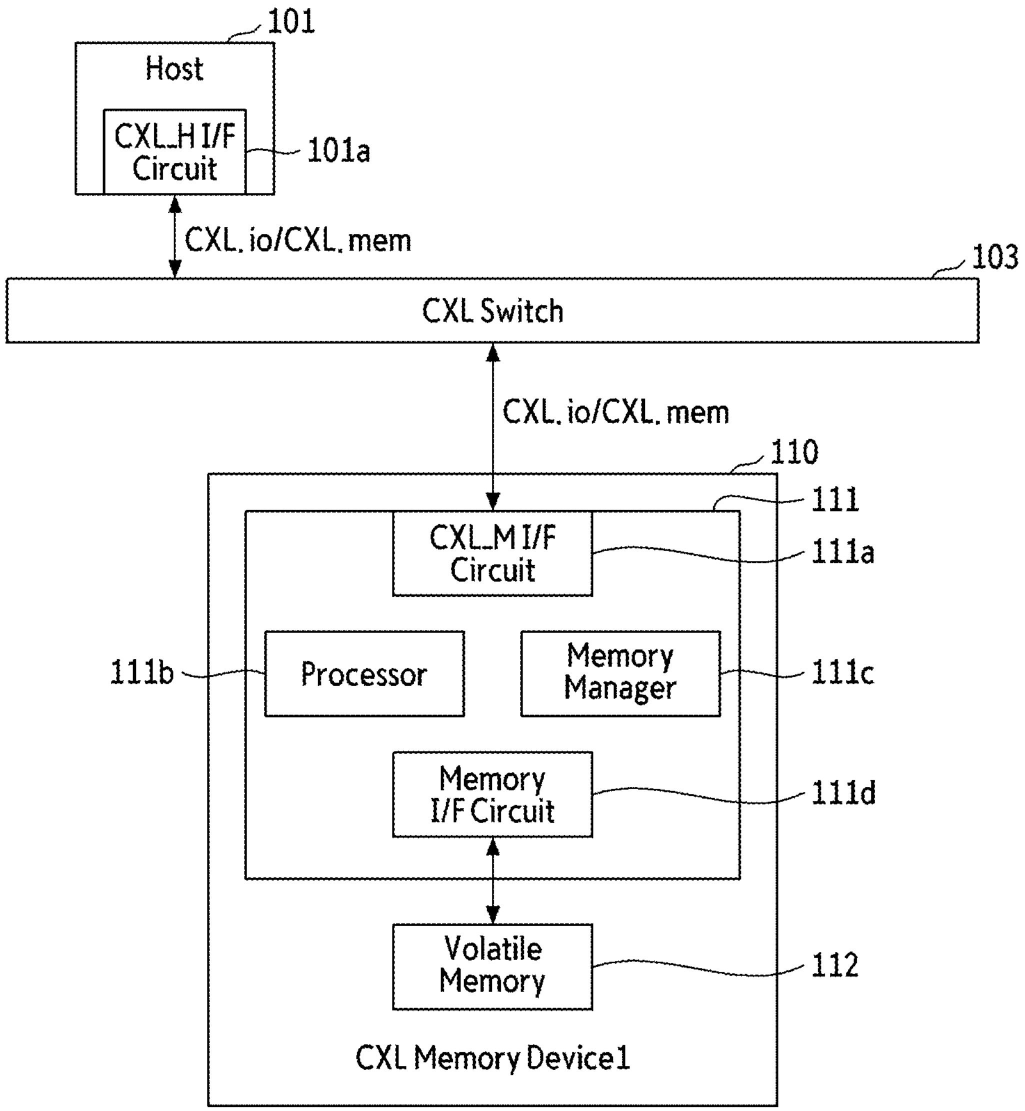
FIG. 2 is an example diagram illustrating components of the host and the CXL memory device in FIG. 1.

FIG. 2 is an example diagram illustrating components of the host and the CXL memory device in FIG. 1.

For the convenience of explanation, it will hereinafter be assumed that the host 101 and the CXL memory device 110 communicate with each other via a CXL interface, but the present disclosure is not limited thereto. That is, the host 101 and the CXL memory device 110 may communicate with each other based on various computing interfaces such as GEN-Z, NVLink, CCIX, or Open CAPI protocols.

Referring to FIG. 2, the CXL interface may include sub-protocols, CXL.io and/or CXL.mem. The CXL.io protocol, as a PCIe transaction layer, may be used for tasks such as device discovery, interrupt management, register-based access, initialization, and signal error handling in the memory system 100. The CXL.mem protocol may be used when the host 101 accesses the dedicated memory of an accelerator or the CXL memory device 110.

In some embodiments, the host 101 and the CXL memory device 110 may communicate with each other using CXL.io, which is an I/O protocol. CXL.io may have a PCIe-based non-coherent I/O protocol. The host 101 and the CXL memory device 110 may exchange various types of information using CXL.io.

The host 101 may include a CXL host interface circuit 101*a*. The CXL host interface circuit 101*a* may communicate with the CXL memory device 110 via the CXL interface provided by the CXL switch 103. Specifically, the CXL host interface circuit 101*a* may communicate with the CXL memory device 110 through the CXL switch 103.

The CXL memory device 110 may include a CXL memory controller 111 and a volatile memory 112. The CXL memory controller 111 may include a CXL memory interface circuit 111*a*, a processor 111*b*, a memory manager 111*c*, and a memory interface circuit 111*d*.

The CXL memory interface circuit 111*a* may be connected to the CXL switch 103. The CXL memory interface circuit 111*a* may communicate with the host 101, another CXL memory device, or a CXL storage device through the CXL switch 103.

The processor 111*b* may be configured to control general operations of the CXL memory controller 111. The memory manager 111*c* may be configured to manage the volatile memory 112. For example, the memory manager 111*c* may convert a memory address (e.g., a logical address or a virtual address) accessed by the host 101 into a physical address of the volatile memory 112. In some embodiments, the memory address may be an address for managing the storage area of the CXL memory device 110 and may be a logical or virtual address designated and managed by the host 101.

The CXL memory interface circuit 111*a* may control the volatile memory 112 to store data or read out data from the volatile memory 112. In some embodiments, the memory interface circuit 111*d* may be implemented to comply with standard protocols such as the DDR interface or the low power double data rate (LPDDR) interface.

The volatile memory 112 may store data or output stored data under the control of the CXL memory controller 111. Additionally, the volatile memory 112 may store various information necessary for the operation of the CXL memory device 110. In some embodiments, the volatile memory 112 may be a high-speed memory such as DRAM.

Figure 3:
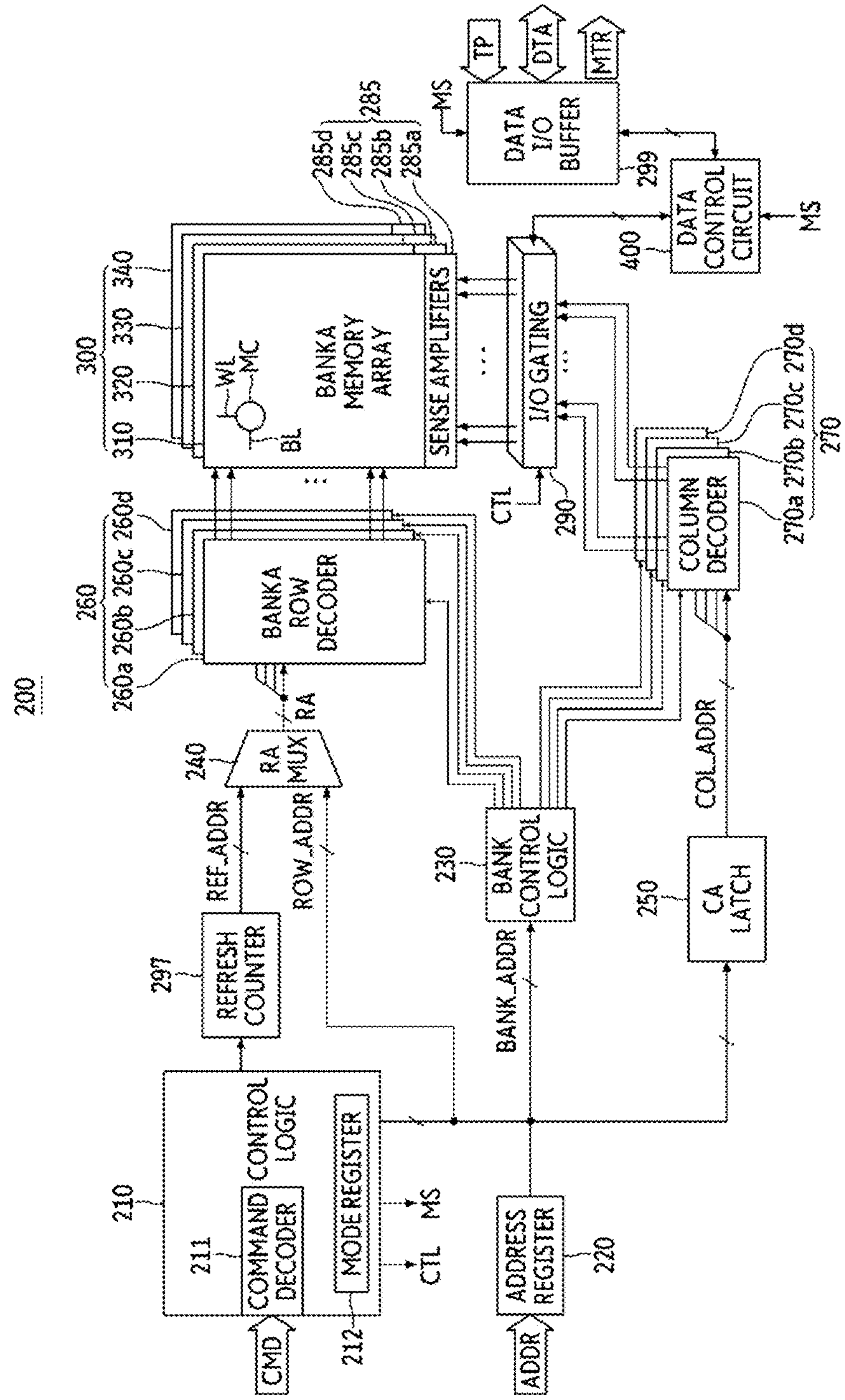
FIG. 3 is a diagram illustrating the configuration of the CXL memory device illustrated in FIGS. 1 and 2.

FIG. 3 is a diagram illustrating the configuration of the CXL memory device illustrated in FIGS. 1 and 2.

Referring to FIG. 3, a memory device 200 may correspond to the CXL memory device 110 illustrated in FIGS. 1 and 2. The memory device 200 may include control logic 210, an address register 220, bank control logic 230, a refresh counter 297, a row address multiplexer 240, a column address latch 250, a row decoder 260, a column decoder 270, a memory cell array 300, a sense amplifier section 285, an I/O gating circuit 290, a data control circuit 400, and a data I/O buffer 299.

The memory cell array 300 may include first, second, third, and fourth bank arrays 310, 320, 330, and 340. Additionally, the row decoder 260 may include first, second, third, and fourth bank row decoders 260*a*, 260*b*, 260*c*, and 260*d*, connected to the first, second, third, and fourth bank arrays 310, 320, 330, and 340, respectively, and the column decoder 270 may include first, second, third, and fourth bank column decoders 270*a*, 270*b*, 270*c*, and 270*d*, connected to the first, second, third, and fourth bank arrays 310, 320, 330, and 340, respectively. The sense amplifier section 285 may include first, second, third, and fourth bank sense amplifiers 285*a*, 285*b*, 285*c*, and 285*d*, connected to the first, second, third, and fourth bank arrays 310, 320, 330, and 340, respectively. The first, second, third, and fourth bank arrays 310, 320, 330, and 340, the first, second, third, and fourth bank sense amplifiers 285*a*, 285*b*, 285*c*, and 285*d*, the first, second, third, and fourth bank column decoders 270*a*, 270*b*, 270*c*, and 270*d*, and the first, second, third, and fourth bank row decoders 260*a*, 260*b*, 260*c*, and 260*d* may form first through fourth banks, respectively.

Each of the first, second, third, and fourth bank arrays 310, 320, 330, and 340 may include a plurality of wordlines WL, a plurality of bitlines BL, and a plurality of memory cells MC formed at intersections of the wordlines WL and the bitlines BL. FIG. 3 illustrates an example of a memory device 200 including four banks, but the memory device 200 may include any number of banks.

The address register 220 may receive an address ADDR from the memory controller 111 (illustrated in FIG. 2), where the address ADDR includes a bank address BANK_ADDR, a row address ROW_ADDR, and a column address COL_ADDR. The address register 220 may provide the received bank address BANK_ADDR to the bank control logic 230, the received row address ROW_ADDR to the row address multiplexer 240, and the received column address COL_ADDR to the column address latch 250.

The bank control logic 230 may generate bank control signals in response to the bank address BANK_ADDR. In response to the bank control signals, the bank row decoder corresponding to the bank address BANK_ADDR among the first, second, third, and fourth bank row decoders 260*a*, 260*b*, 260*c*, and 260*d* may be activated, and the bank column decoder corresponding to the bank address BANK_ADDR among the first, second, third, and fourth bank column decoders 270*a*, 270*b*, 270*c*, and 270*d* may be activated.

The refresh counter 297 may generate a refresh row address REF_ADDR for refreshing memory cell rows included in the memory cell array 300 under the control of the control logic 210.

The row address multiplexer 240 may receive the row address ROW_ADDR from the address register 220 and the refresh row address REF_ADDR from the refresh counter 297. The row address multiplexer 240 may selectively output either the row address ROW_ADDR or the refresh row address REF_ADDR as a row address RA. The row address RA output from the row address multiplexer 240 may be applied to each of the first, second, third, and fourth bank row decoders 260*a*, 260*b*, 260*c*, and 260*d*.

The bank row decoder activated by the bank control logic 230 among the first, second, third, and fourth bank row decoders 260*a*, 260*b*, 260*c*, and 260*d* may decode the row address RA output from the row address multiplexer 240 to activate the wordline corresponding to the row address RA. For example, the activated bank row decoder may apply a wordline driving voltage to the wordline corresponding to the row address RA.

The column address latch 250 may receive the column address COL_ADDR from the address register 220 and temporarily store the received column address COL_ADDR. Additionally, in burst mode, the column address latch 250 may incrementally increase the received column address COL_ADDR. The column address latch 250 may apply the temporarily stored or incrementally increased column address COL_ADDR to each of the first, second, third, and fourth bank column decoders 270*a*, 270*b*, 270*c*, and 270*d*.

The bank column decoder activated by the bank control logic 230 among the first, second, third, and fourth bank column decoders 270*a*, 270*b*, 270*c*, and 270*d* may activate the sense amplifier corresponding to the bank address BANK_ADDR and column address COL_ADDR through the I/O gating circuit 290.

The I/O gating circuit 290 may include switching circuits for gating I/O data, input data mask logic, read data latches for storing data output from the first, second, third, and fourth bank arrays 310, 320, 330, and 340, and write drivers for writing data into the first, second, third, and fourth bank arrays 310, 320, 330, and 340.

Data to be read from one of the first, second, third, and fourth bank arrays 310, 320, 330, and 340 may be detected by the sense amplifier corresponding to that bank array and stored in the read data latches. The data stored in the read data latches may be provided to the memory controller 100 through the data control circuit 400 and the data I/O buffer 299. Data DTA to be written into one of the first, second, third, and fourth bank arrays 310, 320, 330, and 340 may be provided from the memory controller 100 to the data I/O buffer 299. The data DTA provided to the data I/O buffer 299 may be written into the memory cell array 300 through the data control circuit 400 and the I/O gating circuit 290.

The control logic 210 may control operations of the memory device 200. For example, the control logic 210 may generate control signals to enable the memory device 200 to perform a write operation or a read operation. The control logic 210 may include a command decoder 211 for decoding commands CMD received from the CXL memory controller 111 and a mode register 212 for setting the operation mode of the memory device 200.

For example, the command decoder 211 may decode signals such as a write enable signal /WE, a row address strobe signal /RAS, a column address strobe signal /CAS, and a chip select signal /CS to generate control signals corresponding to the commands CMD. Specifically, the control logic 210 may decode the commands CMD to generate a mode signal MS indicating the operation mode of the memory device 200 and a control signal CTL for controlling the I/O gating circuit 290. The control logic 210 may provide the mode signal MS to the data I/O buffer 299 and the data control circuit 400.

Figure 4:
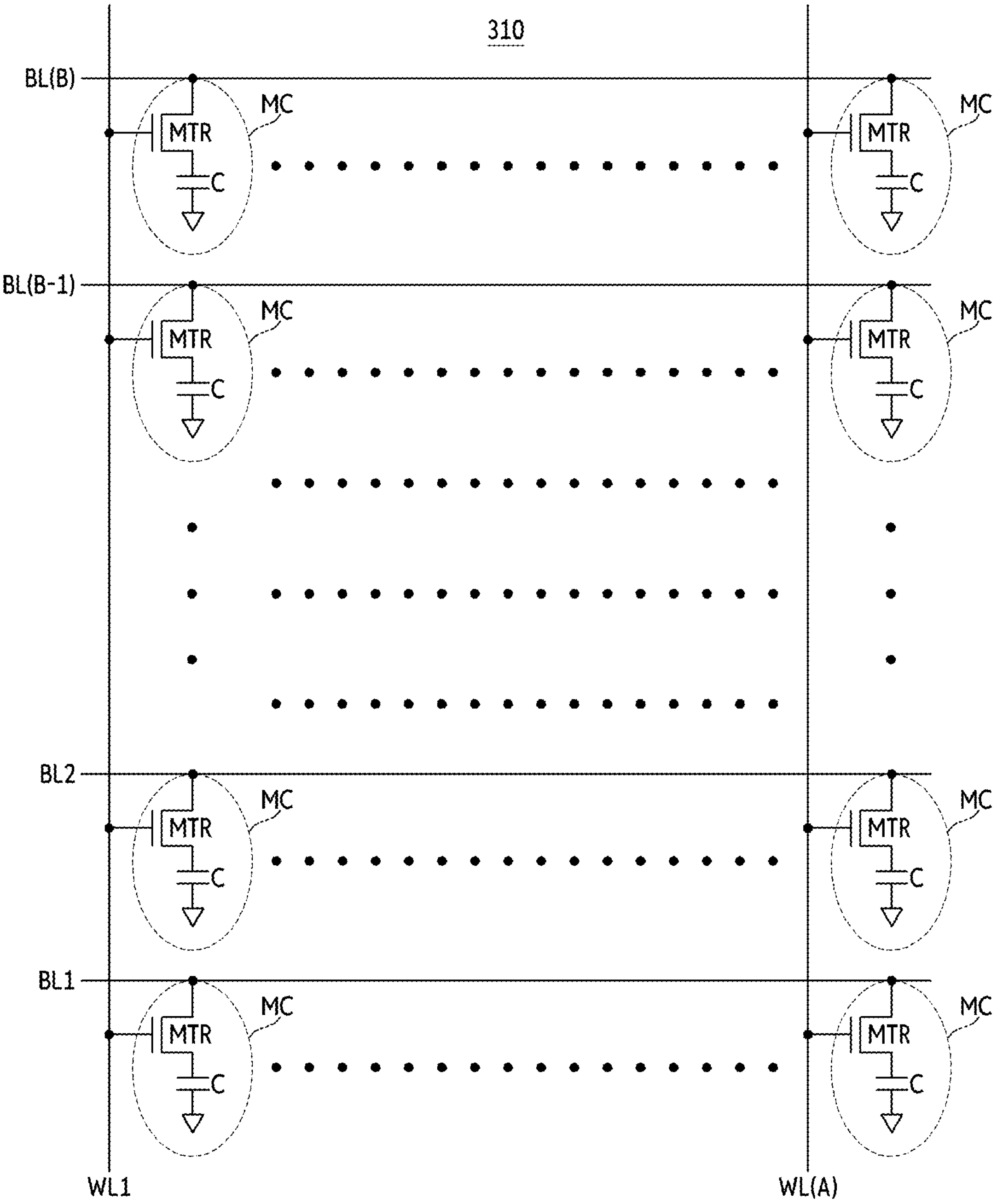
FIG. 4 is a diagram illustrating example memory cells included in the memory cell array of the CXL memory device illustrated in FIG. 3.

FIG. 4 is a diagram illustrating example memory cells included in the memory cell array of the CXL memory device illustrated in FIG. 3.

In FIG. 4, the first bank array 310 among the first, second, third, and fourth bank arrays 310, 320, 330, and 340 included in the memory cell array 300 of FIG. 3 is illustrated as an example. However, the following description of the first bank array 310 is equally applicable to the second, third, and fourth bank arrays 320, 330, and 340.

Referring to FIG. 4, the first bank array 310 may include a plurality of memory cells MC formed at the intersections of a plurality of wordlines WL1 through WL(A) and a plurality of bitlines BL1 through BL(B) (where A and B are arbitrary integers greater than or equal to 2). Each of the memory cells MC may include a cell capacitor C and a transistor MTR. The transistors MTR are selection devices electrically connecting or disconnecting the cell capacitors C to or from the bitlines BL1 through BL(B) based on the voltage of the wordlines WL1 through WL(A). The transistors MTR may be electrically connected between the cell capacitors C, the wordlines WL1 through WL(A), and the bitlines BL1 through BL(B), and the cell capacitors C may be electrically connected between the transistors MTR and a plate voltage.

Figure 5:
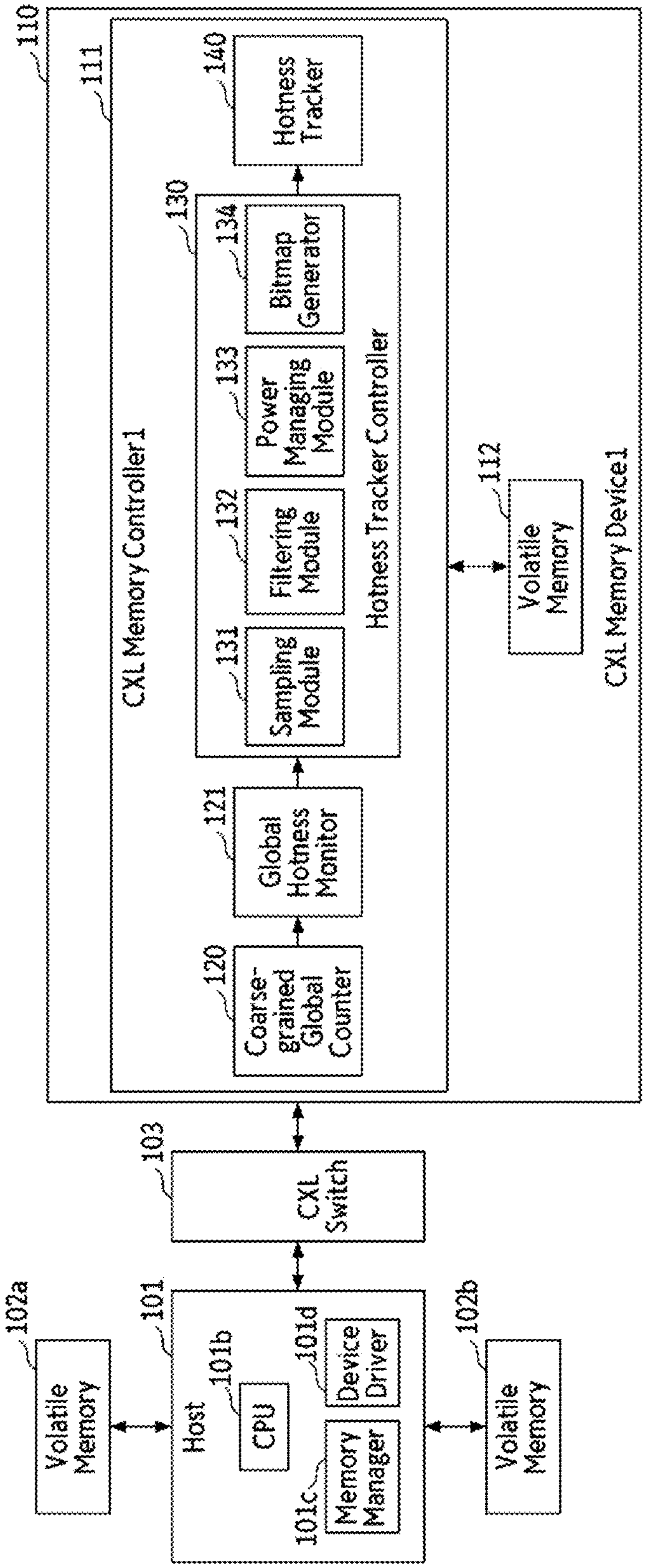
FIG. 5 is a diagram illustrating a memory system according to some embodiments.

FIG. 5 is a diagram illustrating a memory system according to some embodiments.

Figure 6:
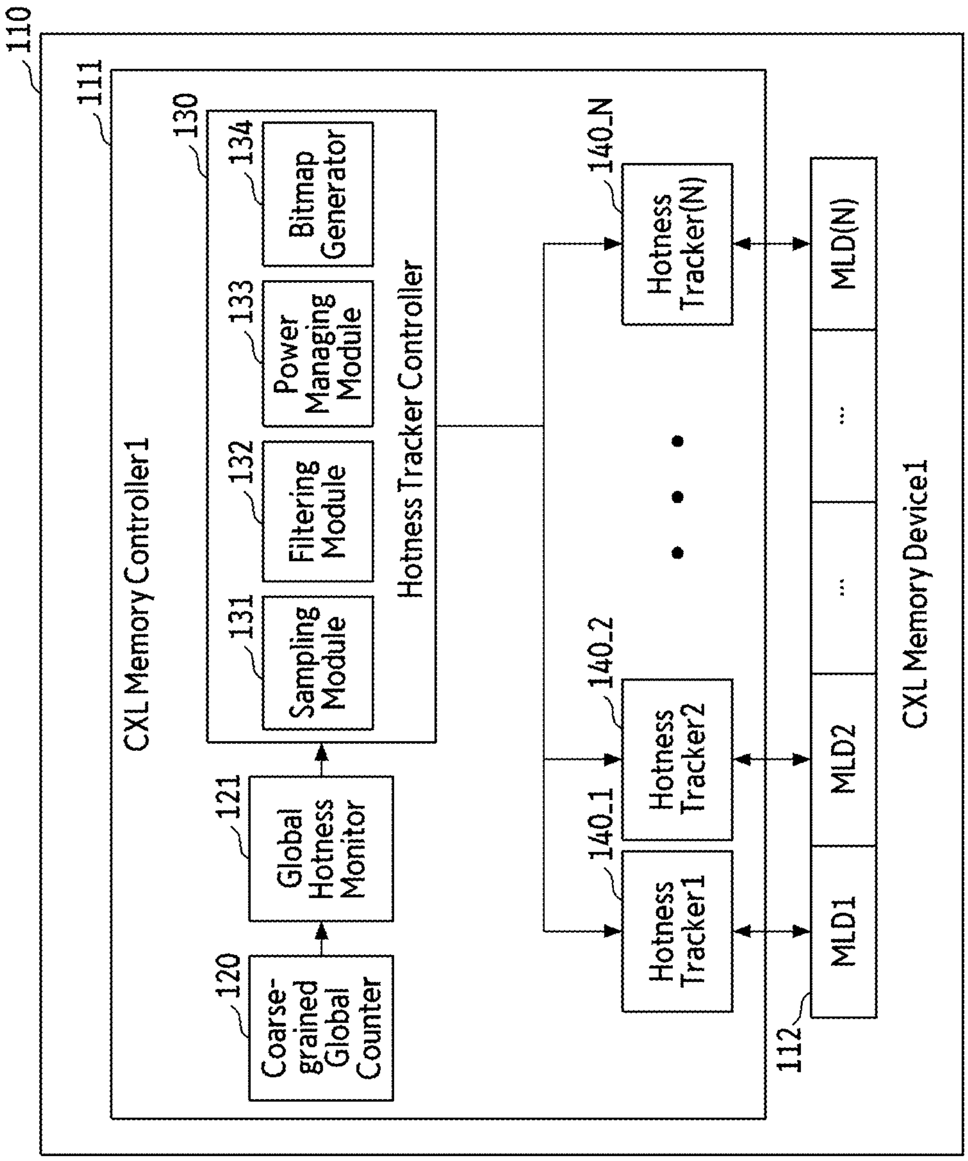
FIG. 6 is a diagram illustrating a memory device illustrated in FIG. 5.

FIG. 6 is a diagram illustrating a memory device illustrated in FIG. 5.

Figure 7:
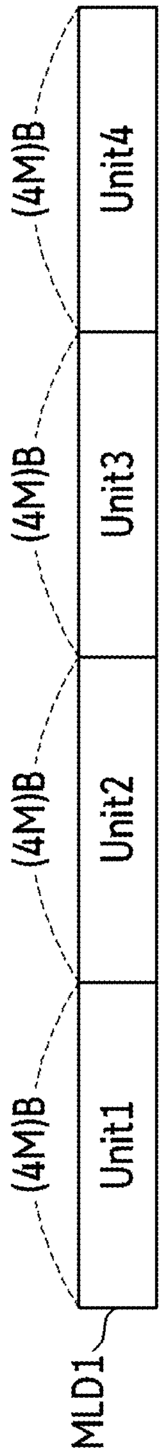
FIGS. 7 and 8 are diagrams illustrating logical memory devices according to some embodiments.
Figure 8:
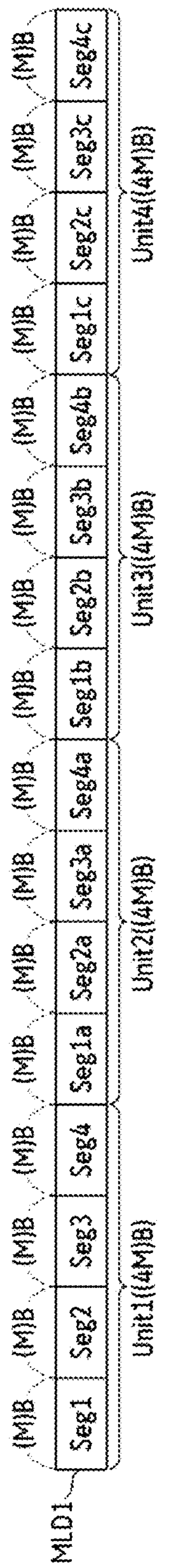

FIGS. 7 and 8 are diagrams illustrating logical memory devices according to some embodiments.

The memory system according to some embodiments will hereinafter be described with reference to FIGS. 5 through 8.

Referring first to FIGS. 5 and 6, the memory system 100 may include a host 101, volatile memories 102*a* and 102*b*, a CXL switch 103, and a CXL memory device 110. The host 101 may include a CPU 101*b*, a memory manager 101*c*, and a device driver 101*d*.

The CPU 101*b* may generally control the operations of the host 101. In some embodiments, the CPU 101*b* may be one of several modules included in an application processor (AP), which may be implemented as a system-on-chip (SOC).

The memory manager 101*c* may perform memory allocation or deallocation so that the host 101 may use the volatile memories 102*a* and 102*b* and the CXL memory device 110. The memory manager 101*c* may be implemented as software.

The device driver 101*d*, which may be detachably mounted to the host 101, may also be implemented as software. The device driver 101*d* may manage the CXL memory device 110 to enable the host 101 to perform a data read or write operation using the CXL memory device 110.

The host 101 may transmit requests to the CXL memory device 110 through the CXL interface provided by the CXL switch 103. The requests transmitted by the host 101 to the CXL memory device 110 may include all types of requests supported by the CXL memory device 110, such as data read and write requests.

The CXL memory device 110 may include a CXL memory controller 111 and a volatile memory 112. The CXL memory controller 111 may receive requests from the host 101 and control the operation of the volatile memory 112 based on the received requests.

The memory region of the volatile memory 112 may be logically divided into multiple regions. For example, the memory region of the volatile memory 112 may be divided into different logical memory devices based on whether the regions are recognized as different memory devices by the host 101. As illustrated in FIG. 6, the volatile memory 112 may include a plurality of logical memory devices MLD1 through MLD(N) (where N is an arbitrary integer greater than or equal to 2).

The logical memory devices MLD1 through MLD(N) included in the volatile memory 112 may be assigned hotness trackers 140_1 through 140_N, respectively. In the following description, logical memory device MLD1 is used as an example, but the description of MLD1 is equally applicable to other logical memory devices MLD2 through MLD(N).

Referring to FIGS. 7 and 8, the logical memory device MLD1 may include multiple segments Seg1, Seg2, Seg3, Seg4, Seg1a through Seg4a, Seg1b through Seg4b, and Seg1c through Seg4c. The segments Seg1, Seg2, Seg3, Seg4, Seg1a through Seg4a, Seg1b through Seg4b, and Seg1c through Seg4c may be physically separated from one another. The segments Seg1, Seg2, Seg3, Seg4, Seg1a through Seg4a, Seg1b through Seg4b, or Seg1c through Seg4c may form one memory unit, and thus, the logical memory device MLD1 may include multiple physically separated memory units Unit1, Unit2, Unit3, Unit4.

FIGS. 7 and 8 illustrate an example where four segments form one memory unit, but the present disclosure is not limited thereto. In some embodiments, for example, three or fewer segments or five or more segments may form a memory unit.

Additionally, FIGS. 7 and 8 illustrate an example where the logical memory device MLD1 includes four memory units Unit1, Unit2, Unit3, Unit4, but the present disclosure is not limited thereto. For example, the logical memory device MLD1 may include three or fewer memory units or five or more memory units. For the convenience of explanation, the following description assumes that the logical memory device MLD1 includes 16 segments Seg1, Seg2, Seg3, Seg4, Seg1a through Seg4a, Seg1b through Seg4b, and Seg1c through Seg4c, with every four segments forming a single memory unit.

Data may be stored in each of the segments Seg1, Seg2, Seg3, Seg4, Seg1a through Seg4a, Seg1b through Seg4b, and Seg1c through Seg4c in response to requests from the host 101. For example, M-byte data (where M is an arbitrary natural number) may be stored in each of the segments Seg1, Seg2, Seg3, Seg4, Seg1a through Seg4a, Seg1b through Seg4b, and Seg1c through Seg4c. Accordingly, each memory unit may have a capacity of 4M bytes.

Referring again to FIGS. 5 and 6, the CXL memory controller 111 may include a coarse-grained global counter 120, a global hotness monitor 121, a hotness tracker controller 130, and the hotness trackers 140_1 through 140_4.

The coarse-grained global counter 120 may count the number of requests received by the CXL memory controller 111 from the host 101. In some embodiments, the coarse-grained global counter 120 may count the number of requests for each memory unit of the logical memory device MLD1 and generate and store count values.

The global hotness monitor 121 may determine whether each memory unit of the logical memory device MLD1 is a hot unit or a cold unit based on the count values from the coarse-grained global counter 120.

The hotness tracker controller 130 may control the operation of the hotness trackers 140_1 through 140_4 based on the results of the determination of the global hotness monitor.

The hotness tracker controller 130 may include a sampling module 131, a filtering module 132, a power management module 133, and a bitmap generator 134 to control the operation of the hotness trackers 140_1 through 140_4.

The CXL memory device 110 may include a plurality of hotness trackers 140_1 through 140_4. When the volatile memory 112 includes a plurality of logical memory devices MLD1 through MLD(N), a hotness tracker may be assigned to each of the logical memory devices MLD1 through MLD(N). For example, the hotness tracker 140_1 assigned to the logical memory device MLD1 may determine the hotness of data stored in each of the segments Seg1, Seg2, Seg3, Seg4, Seg1a through Seg4a, Seg1b through Seg4b, and Seg1c through Seg4c of the logical memory device MLD1, and migrate the data determined to be hot to the volatile memories 102*a* and 102*b* of the host 101.

In the following description, data stored in a specific segment included in the logical memory device MLD1 being hot may mean that the number of requests transmitted by the host 101 to the address corresponding to the specific segment is equal to or greater than a threshold count value. The threshold count value may be a preset value determined by the host 101. As such, among the data stored in the CXL memory device 110, the data frequently accessed by the host 101 may be classified as hot data, and hot data stored in the CXL memory device 110 may then be migrated to the volatile memories 102*a* and 102*b*, making it more easily accessible to the host 101. In this manner, the volatile memories 102*a* and 102*b* in the memory system 100 may serve as top-tier memory, and the volatile memory 112 included in the CXL memory device 110 may serve as lower-tier memory.

Figure 9:
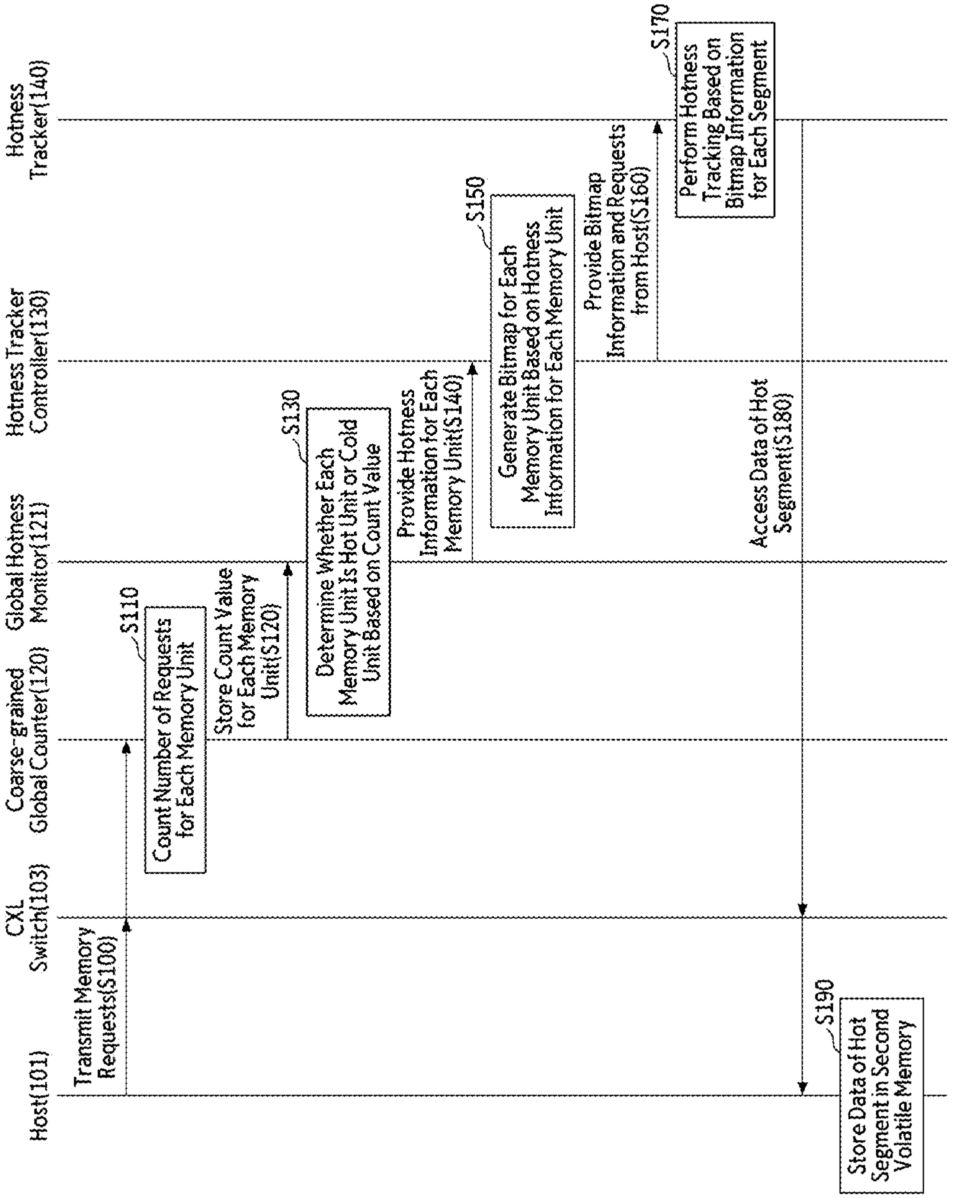
FIG. 9 is a flowchart illustrating the operation of a memory system according to some embodiments.

FIG. 9 is a flowchart illustrating the operation of a memory system according to some embodiments.

Referring to FIG. 9, the host 101 may transmit requests to the coarse-grained global counter 120 through the CXL switch 103 (S100). These requests may include all types of requests supported by the CXL memory device 110, such as data read and write requests.

The coarse-grained global counter 120 may receive requests from the CXL switch 103 and count the number of requests for each memory unit of the logical memory device MLD1, thereby generating count values (S110). Thereafter, the coarse-grained global counter 120 may transmit the count values generated for the respective memory units of the logical memory device MLD1 to the global hotness monitor 121 (S120).

The global hotness monitor 121 may determine whether each memory unit of the logical memory device MLD1 is a hot unit or a cold unit based on the count values received from the coarse-grained global counter 120 (S130).

For example, if the count value for a specific memory unit is less than a cold threshold value, the global hotness monitor 121 may determine that the specific memory unit is a cold unit. Conversely, if the count value for the specific memory unit is greater than a hot threshold value, the global hotness monitor 121 may determine that the specific memory unit is a hot unit.

The cold and hot threshold values used to determine whether each of the memory units of the logical memory device MLD1 is a cold unit or a hot unit may be preset by the host 101. Furthermore, the cold and hot threshold values may be set differently for each memory unit even within the same logical memory device MLD1 by the host 101.

The global hotness monitor 121 may transmit the results of the determination to the hotness tracker controller 130 (S140).

Based on hotness information received from the global hotness monitor 121, the hotness tracker controller 130 may generate a bitmap for each memory unit of the logical memory device MLD1 (S150). The hotness tracker controller 130 may transmit the information of the generated bitmap along with the requests from the host 101 to the hotness tracker 140 (S160), and the hotness tracker 140 may perform hotness tracking for each segment of the logical memory device MLD1 based on bitmap information (S170).

The bitmap may include information indicating whether the hotness tracker 140 needs to continue performing hotness tracking for each particular segment. For example, if the bitmap generator 134 of the hotness tracker controller 130 determines that hotness tracking for a specific memory unit should continue, the bitmap generator 134 may set the corresponding bit in the bitmap for the specific memory unit. Once the bit corresponding to the specific memory unit is set, the hotness tracker controller 130 may transmit the requests of the host 101 received for the specific memory unit to the hotness tracker 140.

Conversely, if it is determined that hotness tracking for a specific memory unit is unnecessary, the corresponding bit in the bitmap may be cleared. Once the bit corresponding to the specific memory unit is cleared, the hotness tracker controller 130 may stop transmitting the requests of the host 101 for the specific memory unit to the hotness tracker 140.

Thereafter, based on the bitmap, the hotness tracker 140 may provide the data of segments determined to be hot to the host 101 through the CXL switch 103 (S180). For example, the hotness tracker 140 may receive the requests of host 101 for a specific memory unit along with bitmap information for the specific memory unit. In some embodiments, the hotness tracker 140 may include a counter that counts the number of requests received for each segment of the specific memory unit. Accordingly, the counter included in the hotness tracker 140 may count the number of requests received from the host 101 for each segment and determine that the data stored in a specific segment is hot if the number of requests for the address corresponding to the specific segment exceeds the threshold count value set by the host 101.

Thereafter, the host 101 may store the data of the hot segments received through the CXL switch 103 in the volatile memories 102*a* and 102*b* (S190).

As described above, in the present disclosure, the operation in which the hotness tracker 140 determines that the data stored in a segment is hot and ensures that the hot data is stored in the top-tier memory of the host 101 is defined as hotness tracking.

Figure 10:
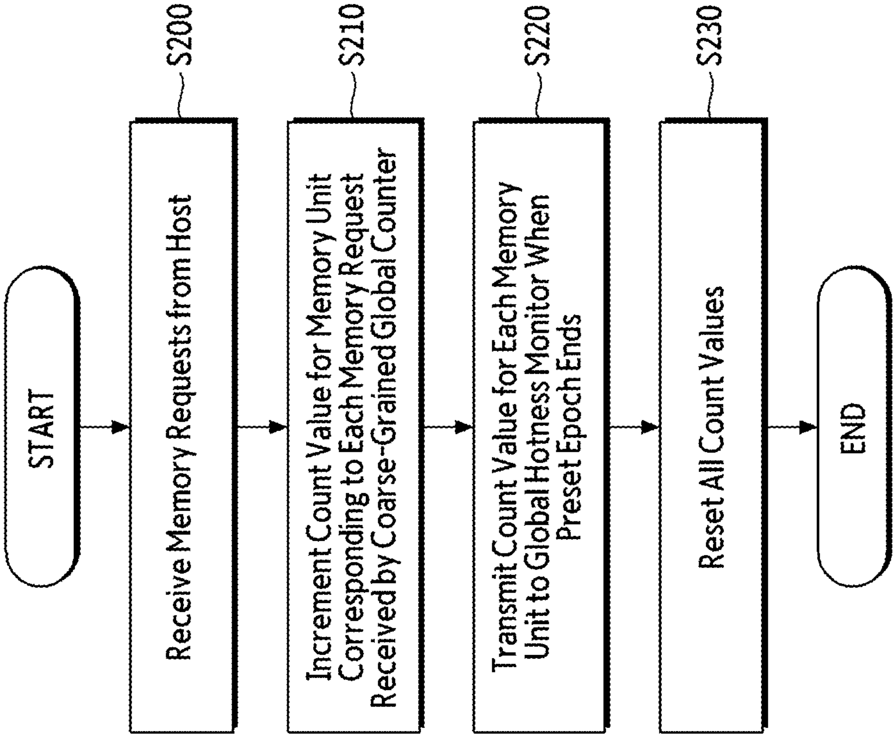
FIG. 10 is a flowchart illustrating the operation of a coarse-grained global counter according to some embodiments.
Figure 11:
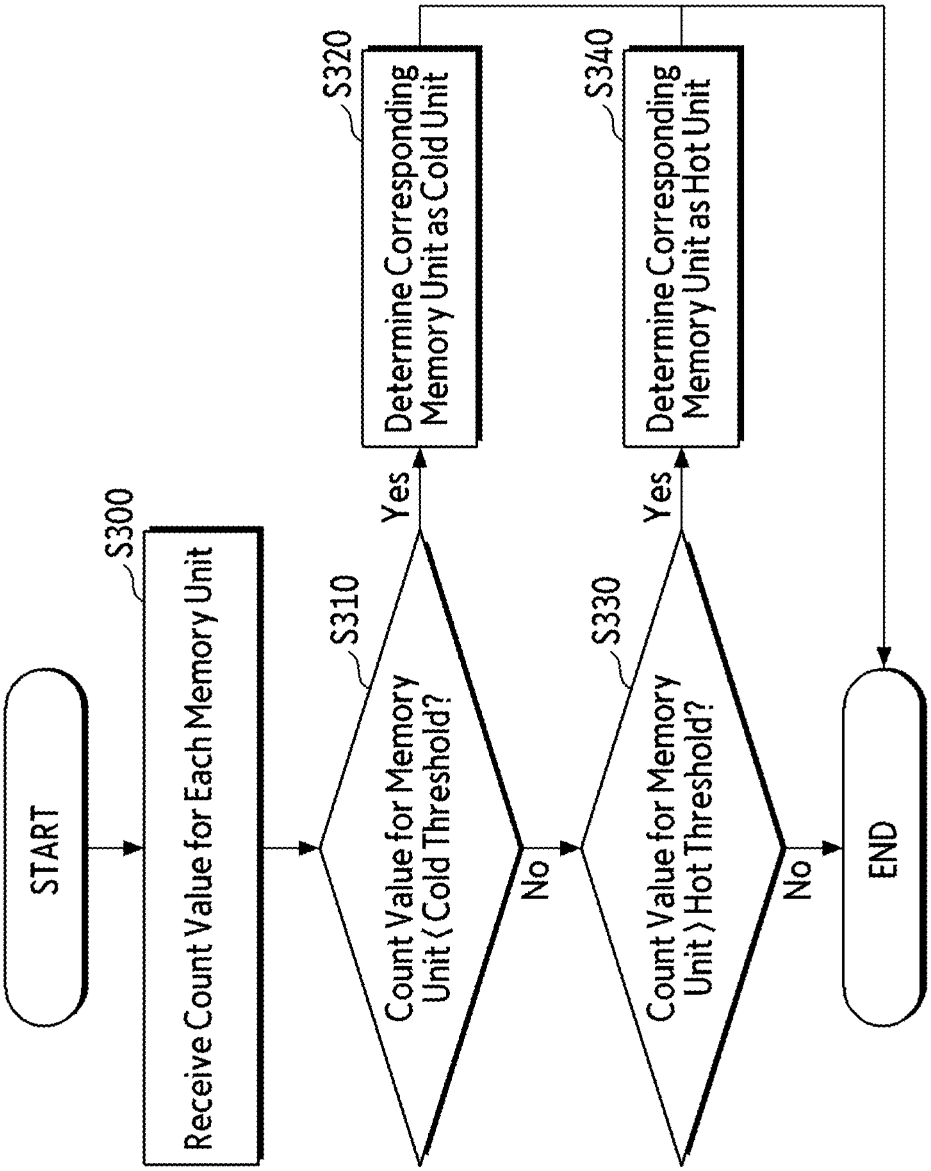
FIG. 11 is a flowchart illustrating the operation of a global hotness monitor according to some embodiments.
Figure 12:
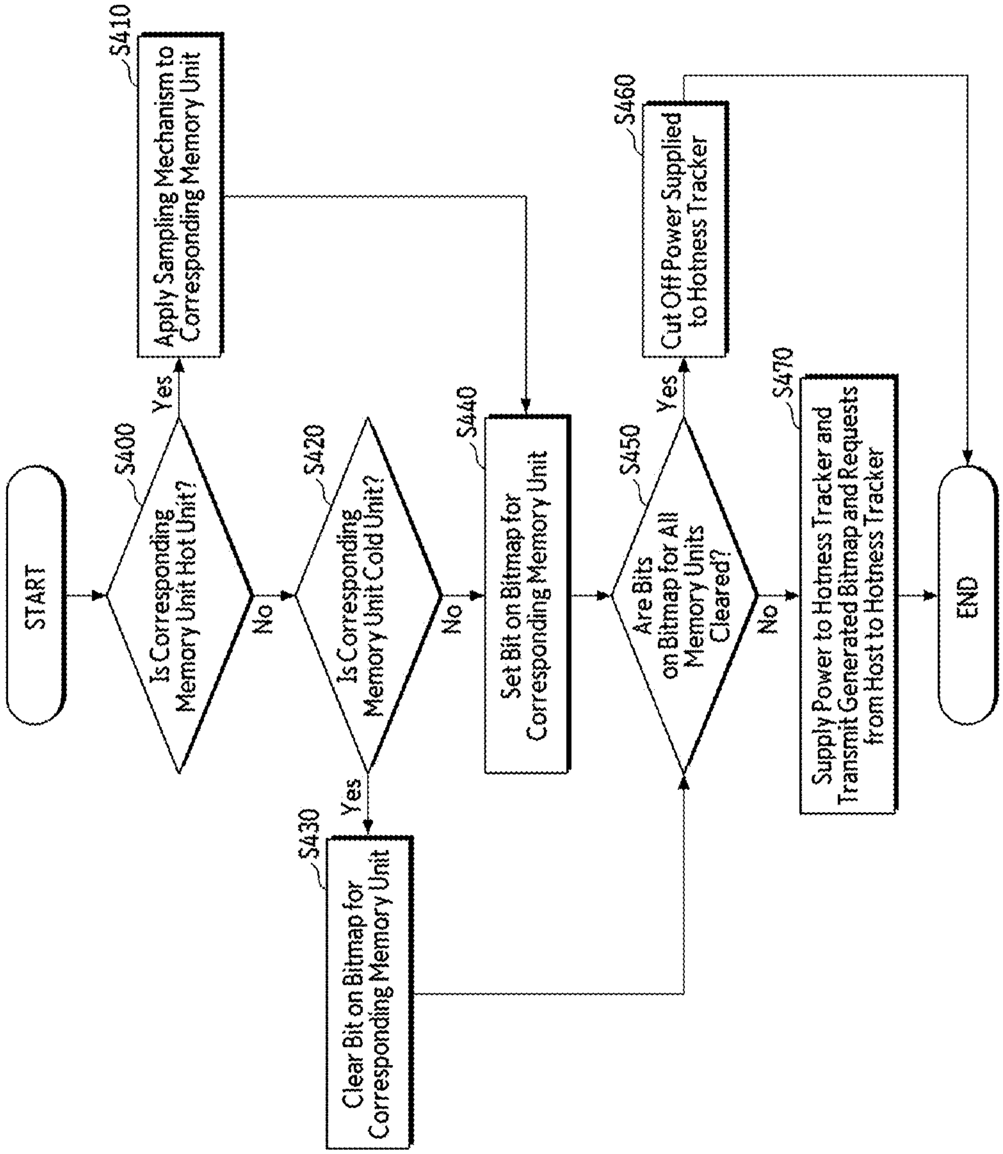
FIG. 12 is a flowchart illustrating the operation of a hotness tracker controller according to some embodiments.
Figure 13:
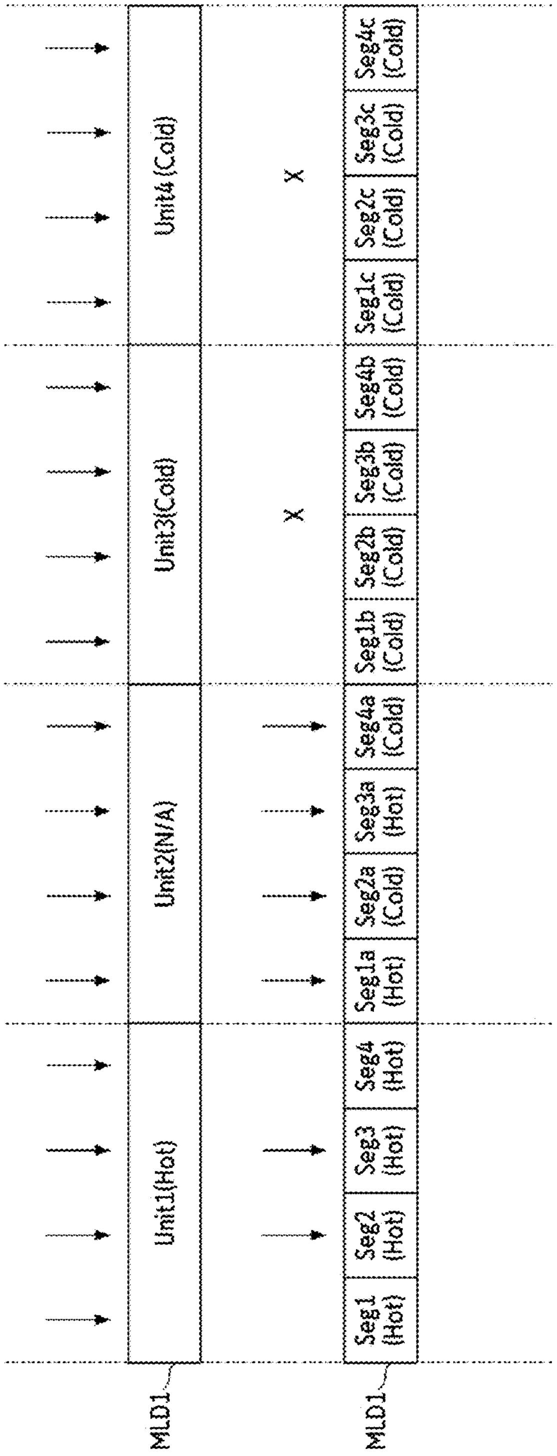
Figure 15:
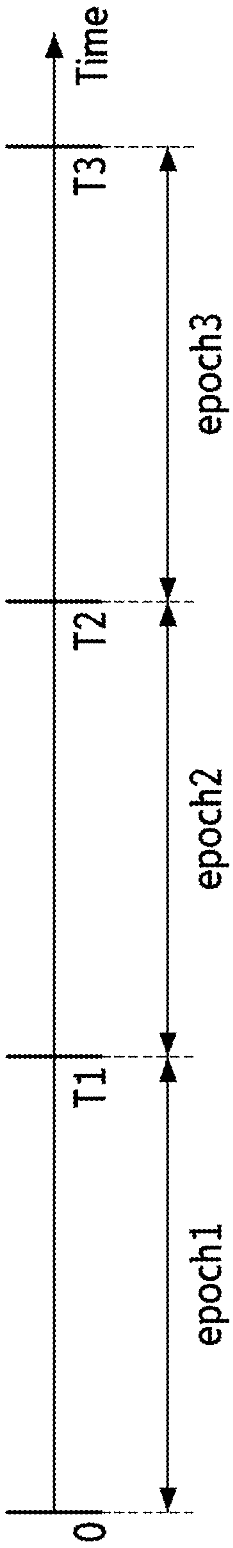
Figure 16:
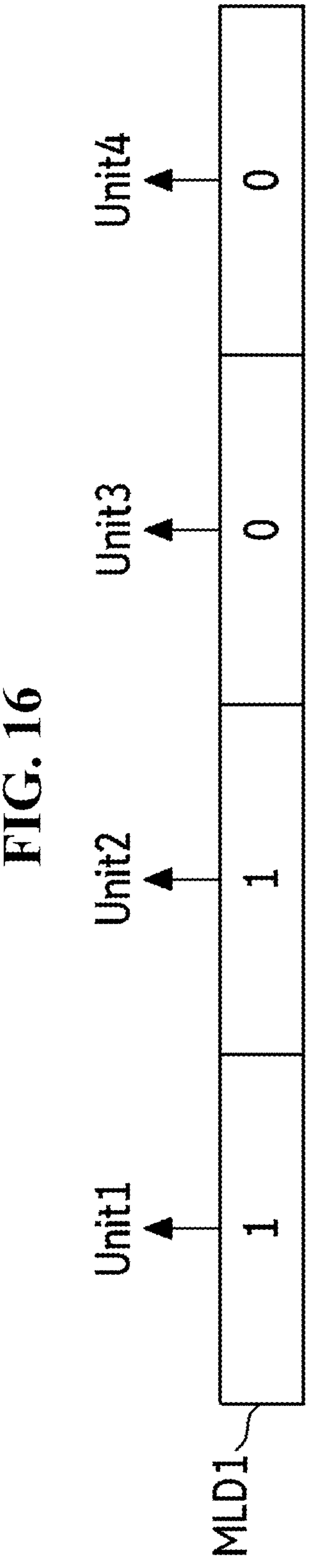
FIG. 16 is a diagram illustrating a bitmap generated by the hotness tracker controller according to some embodiments.

FIG. 10 is a flowchart illustrating the operation of a coarse-grained global counter according to some embodiments. FIG. 11 is a flowchart illustrating the operation of a global hotness monitor according to some embodiments. FIG. 12 is a flowchart illustrating the operation of a hotness tracker controller according to some embodiments. FIGS. 13 through 15 are diagrams illustrating the operation of the hotness tracker controller according to some embodiments. FIG. 16 is a diagram illustrating a bitmap generated by the hotness tracker controller according to some embodiments.

The operations of the coarse-grained global counter, the global hotness monitor, and the hotness tracker controller according to some embodiments will hereinafter be described with reference to FIGS. 10 through 16.

Referring to FIGS. 10, 13, 14, and 15, the coarse-grained global counter 120 may receive requests from the host 101 (S200). The arrows illustrated in FIG. 13 may represent requests transmitted by the host 101 to the CXL memory controller 111. For example, the host 101 may transmit four requests to each of the memory units Unit1, Unit2, Unit3, Unit4 of the logical memory device MLD1.

The coarse-grained global counter 120 may increment the count value of the memory unit corresponding to each received request (S210). At this time, the coarse-grained global counter 120 may count the requests received for each of the memory units Unit1, Unit2, Unit3, Unit4 during a single epoch. For example, referring to FIG. 15, the coarse-grained global counter 120 may count the requests received for each of the memory units Unit1, Unit2, Unit3, Unit4 during ‘epoch1’ and thereby generate a count value for each of the memory units Unit1, Unit2, Unit3, Unit4.

When the current epoch ends, the coarse-grained global counter 120 may transmit the count values generated for the respective memory units Unit1, Unit2, Unit3, Unit4 to the global hotness monitor 121 (S220) and then reset all the count values (S230). For example, referring to FIG. 15, during epoch1, corresponding to the period from time 0 to time T1, the coarse-grained global counter 120 may count the number of requests for each of the memory units Unit1, Unit2, Unit3, Unit4, and transmit the count values generated for the memory units Unit1, Unit2, Unit3, Unit4 to the global hotness monitor 121 at time T1 when epoch1 ends.

Thereafter, at time T1, the count values for the memory units Unit1, Unit2, Unit3, Unit4 may all be reset, and during the subsequent epoch, i.e., ‘epoch2,’ corresponding to the period from time T1 to time T2, the coarse-grained global counter 120 may count the number of requests received from the host 101 for each of the memory units Unit1, Unit2, Unit3, Unit4 and generate a new count value for each of the memory units Unit1, Unit2, Unit3, Unit4. The coarse-grained global counter 120 may repeat the same operation for ‘epoch3,’ corresponding to the period from time T2 to time T3.

Thereafter, referring to FIGS. 11, 13, 14, and 15, the global hotness monitor 121 may receive the count value for each of the memory units Unit1, Unit2, Unit3, Unit4 from the coarse-grained global counter 120 at time T1 when epoch1 ends (S300). Thereafter, the global hotness monitor 121 may determine whether the count value for each of the memory units Unit1, Unit2, Unit3, Unit4 is less than the cold threshold value (S310). If it is determined that the count value for a specific memory unit is less than the cold threshold value (S310—Yes), the global hotness monitor 121 may classify the specific memory unit as a cold unit (S320).

If the global hotness monitor 121 determines that the count value for the specific memory unit is not less than the cold threshold value (S310—No), the global hotness monitor 121 may then determine whether the count value for the specific memory unit is greater than the hot threshold value (S330). If it is determined that the count value for the specific memory unit is greater than the hot threshold value (S330—Yes), the global hotness monitor 121 may classify the specific memory unit as a hot unit (S340). If the count value for the specific memory unit is determined not to exceed the hot threshold value (S330—No), the operation of the global hotness monitor 121 may terminate.

For example, referring to FIG. 13, the global hotness monitor 121 may classify the memory unit Unit1 as a hot unit, determine that the memory unit Unit2 is neither a hot unit nor a cold unit, and classify the memory units Unit3 and Unit4 as cold units.

For example, if the host 101 sets the hot threshold value for the memory unit Unit1 to 3, the global hotness monitor 121 may determine that the memory unit Unit1 is a hot unit because the coarse-grained global counter 120 has counted four requests for the memory unit Unit1 during epoch1.

Similarly, if the host 101 sets the cold and hot threshold values for the memory unit Unit2 to 2 and 5, respectively, the global hotness monitor 121 may determine that the memory unit Unit2 is neither a cold unit nor a hot unit because the coarse-grained global counter 120 has counted four requests for the memory unit Unit2 during epoch1.

For example, if the host 101 sets the cold threshold value for the memory units Unit3 and Unit4 to 5, the global hotness monitor 121 may classify the memory units Unit3 and Unit4 as cold units because the coarse-grained global counter 120 has counted four requests for the memory units Unit3 and Unit4 during epoch1.

Referring to FIGS. 14 and 15, the global hotness monitor 121 may determine whether each memory unit of the logical memory device MLD1 is a hot unit or a cold unit based not only on the count value (or global count value) generated for each memory unit by the coarse-grained global counter 120 but also on the hot segment count value for each memory unit.

For example, at time T2, when epoch2 ends, if the global count value for the memory unit Unit1 during epoch2, as counted by the coarse-grained global counter 120, exceeds the hot threshold value for the memory unit Unit1 preset by the host 101, the global hotness monitor 121 may determine that the memory unit Unit1 is a hot unit. At this time, the global hotness monitor 121 may additionally determine the memory unit Unit1 to be a hot unit based on the hot segment count value corresponding to the number of segments within the memory unit Unit1 that have been determined to be hot during epoch1.

For example, at time T2, if the number of requests received by the memory unit Unit1 during epoch2 exceeds the hot threshold value and the number of segments determined to be hot within the memory unit Unit1 during epoch1 is relatively high, the global hotness monitor 121 may determine the memory unit Unit1 to be a hot unit at time T2. The global hotness monitor 121 may then control the hotness tracker 140 to continue hotness tracking for the segments within the memory unit Unit1 during the subsequent epoch, epoch3.

For example, at time T2, if the global count values for the memory units Unit3 and Unit4 during epoch2, as counted by the coarse-grained global counter 120, are less than the cold threshold values for the memory units Unit3 and Unit4 preset by the host 101, the global hotness monitor 121 may determine that the memory units Unit3 and Unit4 are cold units. At this time, the global hotness monitor 121 may also determine the memory units Unit3 and Unit4 to be cold units based on the hot segment count values corresponding to the numbers of segments within the memory units Unit3 and Unit4 that have been determined to be hot during epoch1.

For example, at time T2, if the numbers of requests received for the memory units Unit3 and Unit4 during epoch2 are less than the cold threshold value, and if no segments within the memory units Unit3 and Unit4 have been determined to be hot during epoch1 (i.e., a hot segment count value of 0), the global hotness monitor 121 may determine at time T2 that the memory units Unit3 and Unit4 are cold units. The global hotness monitor 121 may then control the hotness tracker 140 to stop performing hotness tracking for the segments within the memory units Unit3 and Unit4 during the subsequent epoch, epoch3.

The global count values and the hot segment count values shown in FIG. 14 are merely example, and specific count values may vary from embodiment to embodiment.

Referring to FIGS. 12, 13, 15, and 16, the hotness tracker controller 130 may operate based on the results of the determination of the global hotness monitor 121 regarding whether each memory unit within the logical memory device MLD1 is a hot unit or a cold unit. If a specific memory unit within the logical memory device MLD1 is determined to be a hot unit (S400—Yes), the hotness tracker controller 130 may apply a sampling mechanism to the specific memory unit using the sampling module 131 (S410).

For example, referring to FIG. 13, if the coarse-grained global counter 120 determines that the number of requests received for the memory unit Unit1 during epoch1 exceeds the hot threshold value for the memory unit Unit1 preset by the host 101, the sampling module 131 may transmit only some of the requests received for the memory unit Unit1 during epoch2 to the hotness tracker 140_1 assigned to the logical memory device MLD1.

For example, the host 101 may define the memory unit Unit1 as hot if the memory unit Unit1 is accessed 100 times per second by the host 101, and the hotness tracker 140_1 assigned to MLD1 may define the segments Seg1, Seg2, Seg3, Seg4 within the memory unit Unit1 as hot if the segments Seg1, Seg2, Seg3, Seg4 are accessed 10 times per second respectively by the host 101. If the number of accesses to the memory unit Unit1 by the host 101 exceeds 100 per second, the sampling module 131 may sample only some of those accesses during the subsequent epoch without transmitting all the accesses to the hotness tracker 140_1. Even with sampling, there is a high likelihood that the segments Seg1, Seg2, Seg3, Seg4 within the memory unit Unit1 will still be determined to be hot.

Accordingly, if the sampling module 131 determines based on the count value from the coarse-grained global counter 120 that the memory unit Unit1 is a hot unit, the sampling module 131 may transmit only some of the requests (e.g., 1 out of 4 requests) received for the memory unit Unit1 to the hotness tracker 140_1 during the subsequent epoch. In this disclosure, the operation of transmitting only some of the requests of host 101 to the hotness tracker 140_1 assigned to a specific logical memory device (e.g., the logical memory device MLD1) is defined as a sampling operation.

If the memory unit Unit1 is determined to be hot (S440—Yes), the bitmap generator 134 may set the bit in the bitmap corresponding to the memory unit Unit1 (S440). For example, if the memory unit Unit1 is determined to be a hot unit, the bit in the bitmap corresponding to the memory unit Unit1 may be set to “1.”

If a specific memory unit within the logical memory device MLD1 is not determined to be a hot unit (S400—No), the hotness tracker controller 130 may determine whether the specific memory unit is a cold unit (S420). If the specific memory unit is determined to be a cold unit (S420—Yes), the bitmap generator 134 may clear the bit in the bitmap corresponding to the specific memory unit (S430).

For example, if the memory units Unit3 and Unit4 are determined to be cold units, the bits in the bitmap corresponding to the memory units Unit3 and Unit4 may be set to “0.”

Once a memory unit is determined to be cold due to the number of requests falling below the threshold, it is unlikely that data within its segments, considered on a smaller scale, will be classified as hot. Thus, the hotness tracker controller 130 may apply a filtering mechanism to that memory unit using the filtering module 132.

The filtering module 132 may filter out the requests of host 101 for the memory units Unit3 and Unit4 if they are determined to be cold units, thereby preventing those requests from being transmitted to the hotness tracker 140_1. As a result, the hotness tracking functionality for the segments Seg1b, Seg2b, Seg3b, Seg4b, and Seg1c, Seg2c, Seg3c, Seg4c of the memory units Unit3 and Unit4 may be deactivated.

If the memory unit Unit2 is determined to be neither a hot unit (S400—No) nor a cold unit (S420—No), the bitmap generator 134 may set the bit in the bitmap corresponding to the memory unit Unit2 to "1."

In this case, the hotness tracker controller 130 may transmit all of the requests of host 101 for the memory unit Unit2 to the hotness tracker 140_1 without sampling or filtering.

Through this process, the bitmap generator 134 may generate a bitmap for the logical memory device MLD1 as illustrated in FIG. 16.

Thereafter, the hotness tracker controller 130 may then determine whether all bits in the bitmap for the memory units Unit1, Unit2, Unit3, Unit4 within the logical memory device MLD1 have been cleared (S450). If all bits in the bitmap have been cleared (S450—Yes), the power management module 133 may cut off the power supplied to the hotness tracker 140_1 (S460).

If not all bits in the bitmap have been cleared (S450—No), the power management module 133 may supply power to the hotness tracker 140_1 and transmit the generated bitmap along with the requests of host 101 for the respective memory units or segments to the hotness tracker 140_1 (S470). For example, if the hotness tracker controller 130 transmits requests for each of a plurality of memory units to the hotness tracker 140, the counter within the hotness tracker 140 may count the number of requests received from the host 101 for each segment. If the number of requests for the address corresponding to a specific segment exceeds the threshold count value set by the host 101, the hotness tracker 140 may determine that the data stored in that specific segment is hot.

Figure 17:
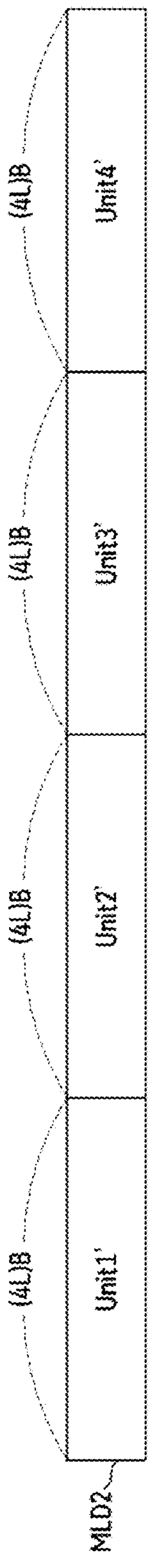
FIGS. 17 and 18 are diagrams illustrating logical memory devices according to some embodiments.
Figure 18:
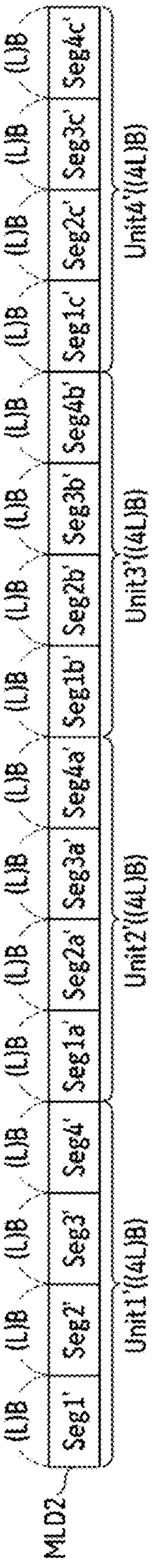
Figure 19:
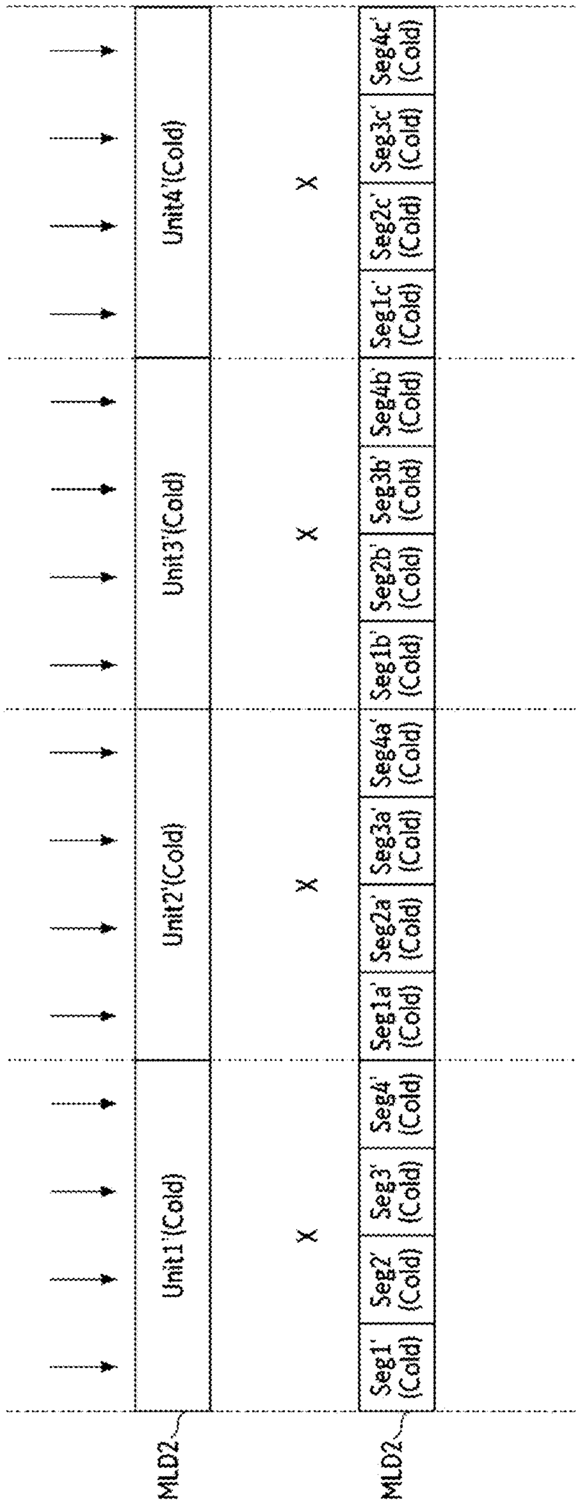
FIG. 19 is a diagram illustrating the operation of a hotness tracker controller according to some embodiments.
Figure 20:
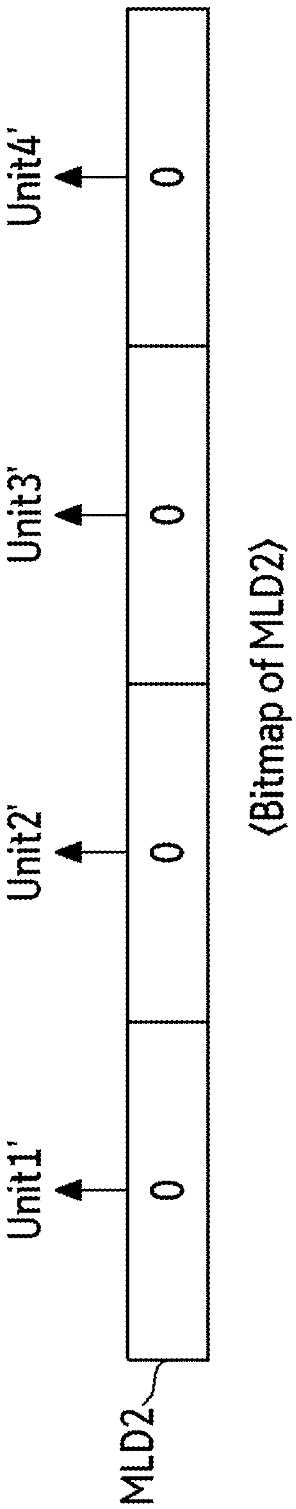
FIG. 20 is a diagram illustrating a bitmap generated by the hotness tracker controller according to some embodiments.

FIGS. 17 and 18 are diagrams illustrating logical memory devices according to some embodiments. FIG. 19 is a diagram illustrating the operation of a hotness tracker controller according to some embodiments. FIG. 20 is a diagram illustrating a bitmap generated by the hotness tracker controller according to some embodiments.

The operation of the hotness tracker controller according to some embodiments will hereinafter be described with reference to FIGS. 17 through 20. Redundant descriptions overlapping with the previously explained embodiments will be omitted, and the differences will be emphasized.

Referring to FIGS. 17 and 18, a logical memory device MLD2 may include a plurality of segments Seg1', Seg2', Seg3', Seg4', Seg1a', Seg2a', Seg3a', Seg4a', Seg1b', Seg2b', Seg3b', Seg4b', and Seg1c', Seg2c', Seg3c', Seg4c'. The segments Seg1', Seg2', Seg3', Seg4', Seg1a', Seg2a', Seg3a', Seg4a', Seg1b', Seg2b', Seg3b', Seg4b', and Seg1c', Seg2c', Seg3c', Seg4c' may be physically separated from one another. The segments Seg1', Seg2', Seg3', Seg4', Seg1a', Seg2a', Seg3a', Seg4a', Seg1b', Seg2b', Seg3b', Seg4b', and Seg1c', Seg2c', Seg3c', Seg4c' may form a single memory unit, and thus, the logical memory device MLD2 may include a plurality of physically separated memory units Unit1', Unit2', Unit3', Unit4'.

FIGS. 17 and 18 illustrate an example where four segments form a single memory unit, but the present disclosure is not limited thereto. In some embodiments, for example, three or fewer segments or five or more segments may form a single memory unit.

Additionally, FIGS. 17 and 18 illustrate the logical memory device MLD2 as including four memory units Unit1', Unit2', Unit3', Unit4', but the present disclosure is not limited thereto. For example, the logical memory device MLD2 may include three or fewer memory units or five or more memory units. For convenience of explanation, the following description assumes that the logical memory device MLD2 includes 16 segments Seg1', Seg2', Seg3', Seg4', Seg1a', Seg2a', Seg3a', Seg4a', Seg1b', Seg2b', Seg3b', Seg4b', and Seg1c', Seg2c', Seg3c', Seg4c', with every four segments forming a single memory unit.

Data may be stored in each of the segments included in the logical memory device MLD2 in response to requests from the host 101. For example, L-byte data (where L is an arbitrary natural number) may be stored in each of the segments. Accordingly, each memory unit may have a capacity of 4 L bytes.

Referring to FIG. 19, if the global hotness monitor 121 determines that all memory units Unit1', Unit2', Unit3', Unit4' included in the logical memory device MLD2 are cold units, the hotness tracker controller 130 may apply a filtering mechanism to all the memory units Unit1', Unit2', Unit3', Unit4' in the logical memory device MLD2 using the filtering module 132.

The filtering module 132 may filter out requests from the host 101 for the memory units Unit1', Unit2', Unit3', Unit4' if the memory units Unit1', Unit2', Unit3', Unit4' are all determined to be cold units, thereby preventing those requests from being transmitted to the hotness tracker 140_2. As a result, the hotness tracking functionality of the hotness tracker 140_2 for the segments Seg1', Seg2', Seg3', Seg4', Seg1a', Seg2a', Seg3a', Seg4a', Seg1b', Seg2b', Seg3b', Seg4b', and Seg1c', Seg2c', Seg3c', Seg4c', included in the logical memory device MLD2 may be deactivated.

Referring to FIG. 20, the bitmap generator 134 may clear the bits in the bitmap corresponding to all the memory units Unit1', Unit2', Unit3', Unit4' included in the logical memory device MLD2 (i.e., set the bits to "0," as illustrated in FIG. 20). Once the bits in the bitmap for all the memory units Unit1', Unit2', Unit3', Unit4' in the logical memory device MLD2 have been cleared, the power management module 133 may cut off the power supplied to the hotness tracker 140_2. This may reduce the power consumption of the CXL memory controller 111.

Figure 21:
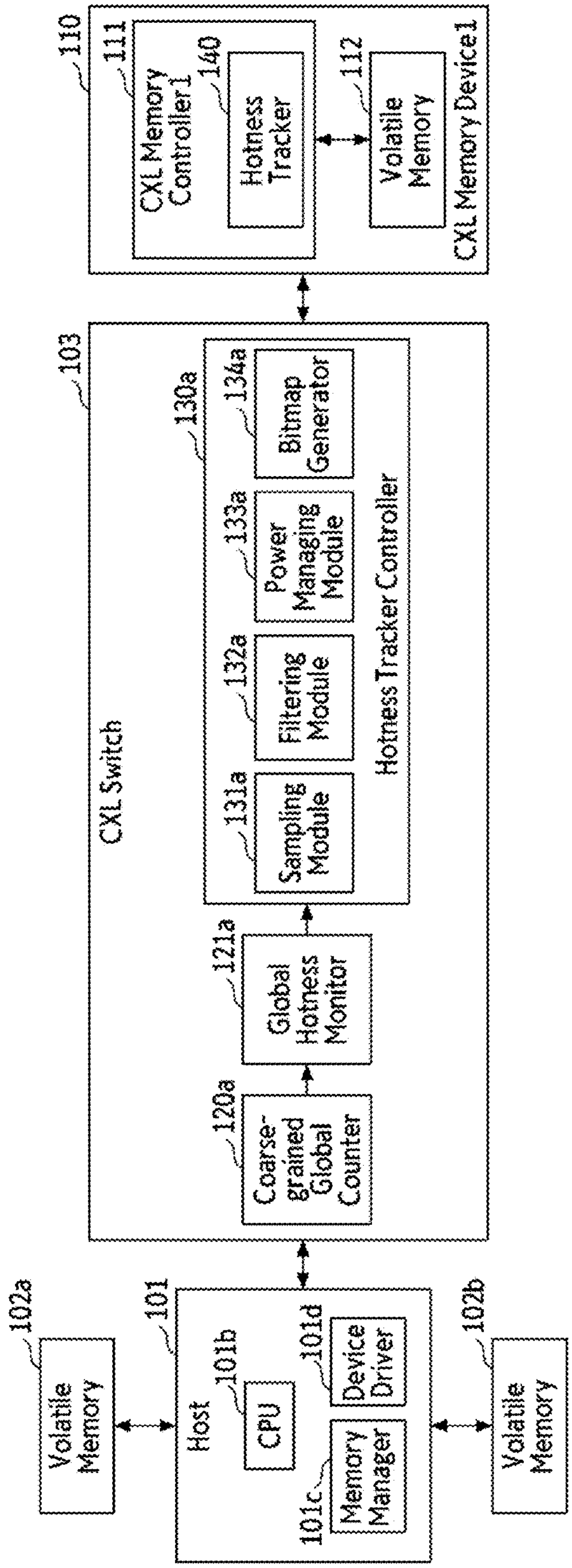
FIG. 21 is a diagram illustrating a memory system according to some embodiments.

FIG. 21 is a diagram illustrating a memory system according to some embodiments. Redundant descriptions overlapping with earlier embodiments will be omitted, and differences will be highlighted.

Referring to FIG. 21, in a memory system 100A, a CXL switch 103 may include a coarse-grained global counter 120*a*, a global hotness monitor 121*a*, a hotness tracker controller 130*a*, a sampling module 131*a*, a filtering module 132*a*, a power management module 133*a*, and a bitmap generator 134*a*. The sampling module 131*a*, filtering module 132*a*, power management module 133*a*, and bitmap generator 134*a* may be part of the hotness tracker controller 130*a*.

In the memory system 100A, unlike in the memory system 100 illustrated in FIG. 5, the coarse-grained global counter 120*a*, the global hotness monitor 121*a*, the hotness tracker controller 130*a*, the sampling module 131*a*, the filtering module 132*a*, the power management module 133*a*, and the bitmap generator 134*a* may be arranged at the level of the CXL switch 103.

When the host 101 transmits a request to access data stored in the volatile memory 112 of the CXL memory device 110 to the CXL switch 103, the coarse-grained global counter 120*a* located within the CXL switch 103 may increment the count value of the memory unit corresponding to the address of the data to be accessed.

The global hotness monitor 121*a* may determine, based on the count value for each memory unit from the coarse-grained global counter 120*a*, whether each memory unit is a hot unit or a cold unit. The hotness tracker controller 130*a* may control the operation of the hotness tracker 140*a* based on the results of the determination of the global hotness monitor 121*a*.

Figure 22:
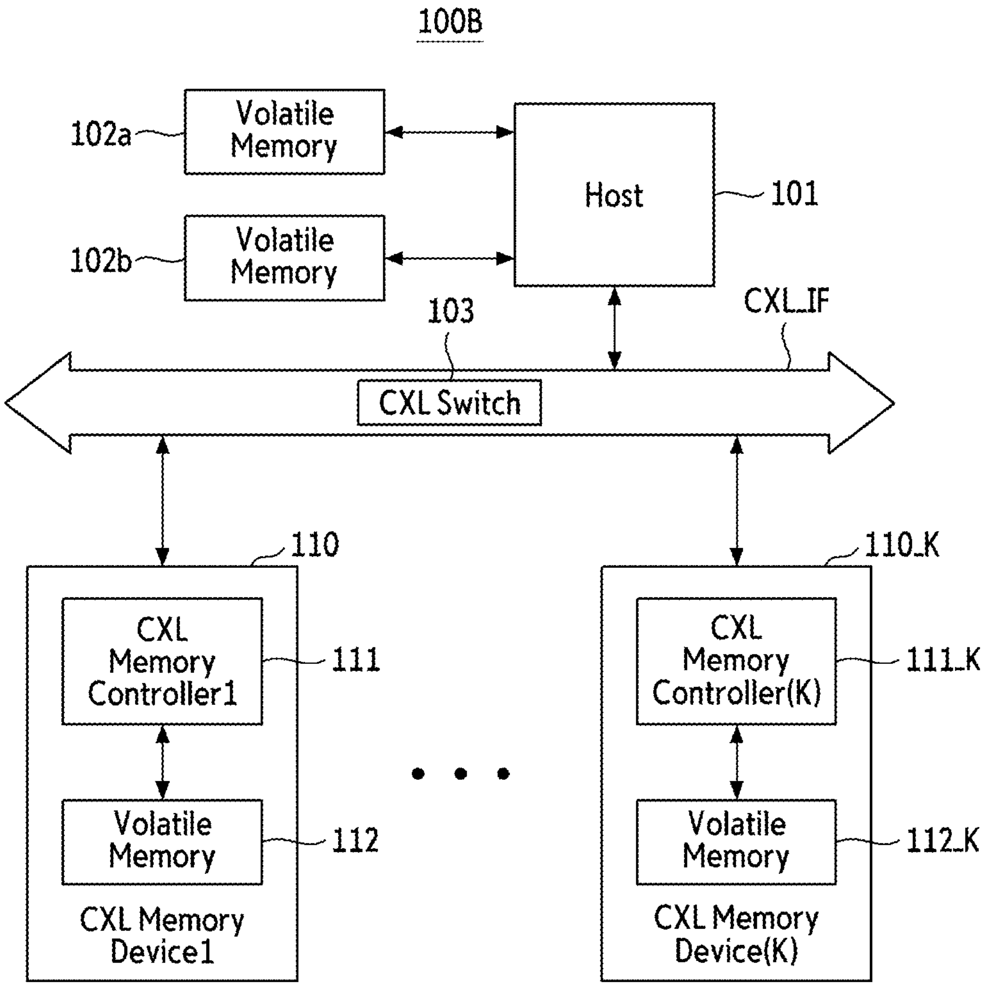
FIGS. 22 and 23 are diagrams illustrating a memory system according to some embodiments.
Figure 23:
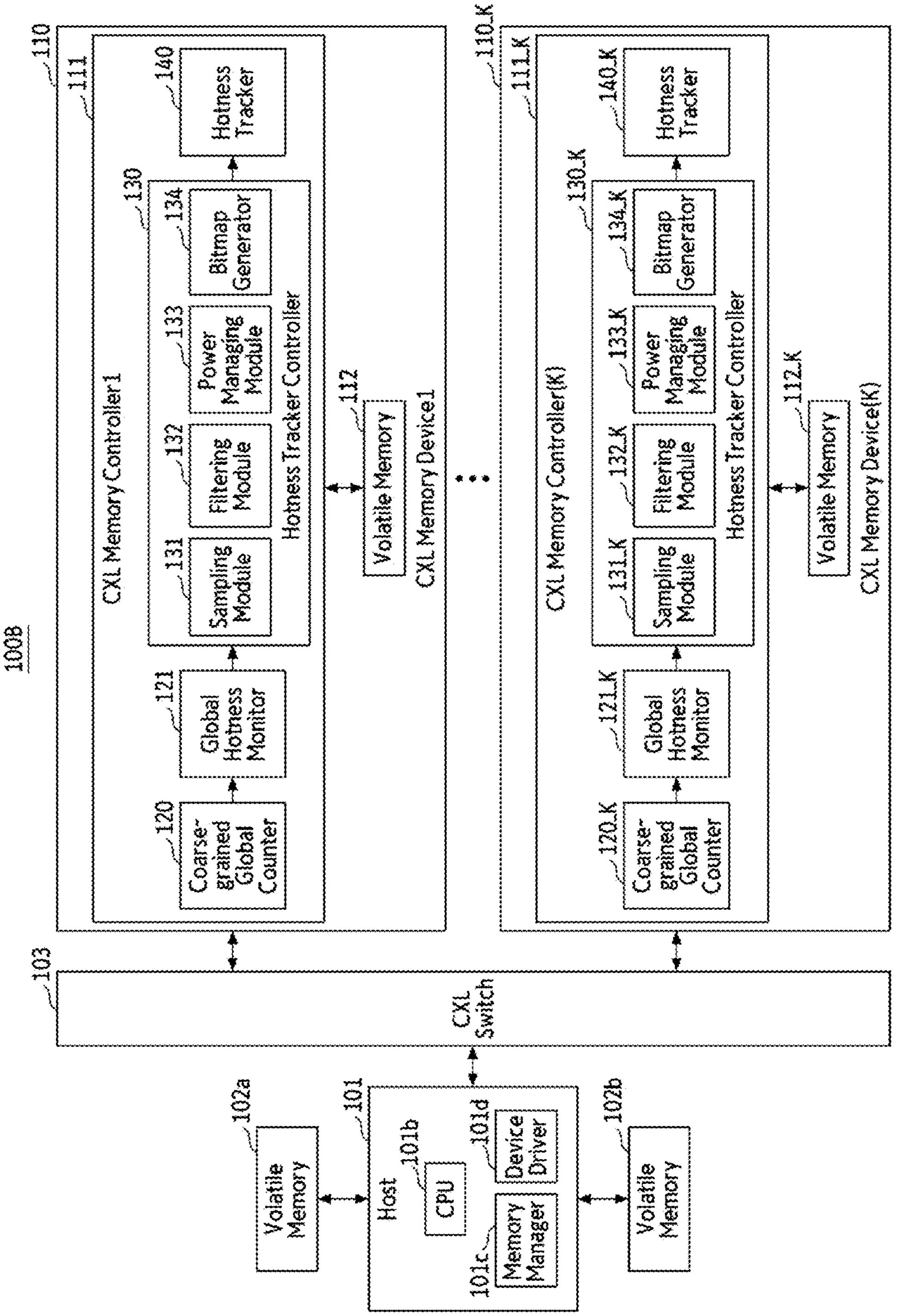

FIGS. 22 and 23 are diagrams illustrating a memory system according to some embodiments.

Referring to FIGS. 22 and 23, a memory system 100B may further include a plurality of CXL memory devices 110_2 through 110_K (where K is an integer of 2 or greater). The CXL memory devices 110_2 through 110_K may have the same configuration as the CXL memory device 110. A host 101 may communicate with the CXL memory devices 110 through a CXL interface CXL_IF provided by a CXL switch 103. Additionally, the CXL memory devices 110 through 110_K may communicate with each other through the CXL interface CXL_IF provided by the CXL switch 103.

The description of the CXL memory device 110 provided with reference to FIGS. 1 through 21 applies equally to the CXL memory devices 110_2 through 110_K. For example, the CXL memory device 110_K may include a CXL memory controller 111_K and a volatile memory 112_K, and the CXL memory controller 111_K may include a coarse-grained global counter 120_K, a global hotness monitor 121_K, a hotness tracker controller 130_K, a sampling module 131_K, a filtering module 132_K, a power management module 133_K, a bitmap generator 134_K, and a hotness tracker 140_K.

In the memory system 100B, the host 101 may access each of the CXL memory devices 110 through 110_K through the CXL interface CXL_IF provided by the CXL switch 103. The CXL memory devices 110 through 110_K may track the hotness of data stored in each of the volatile memory 112 through 112_K while efficiently reducing the power consumption of the CXL memory controllers 111 through 111_K through the coarse-grained global counters 120 through 120_K, global hotness monitors 121 through 121_K, hotness tracker controllers 130 through 130_K, and hotness tracker 140 through 140_K.

Figure 24:
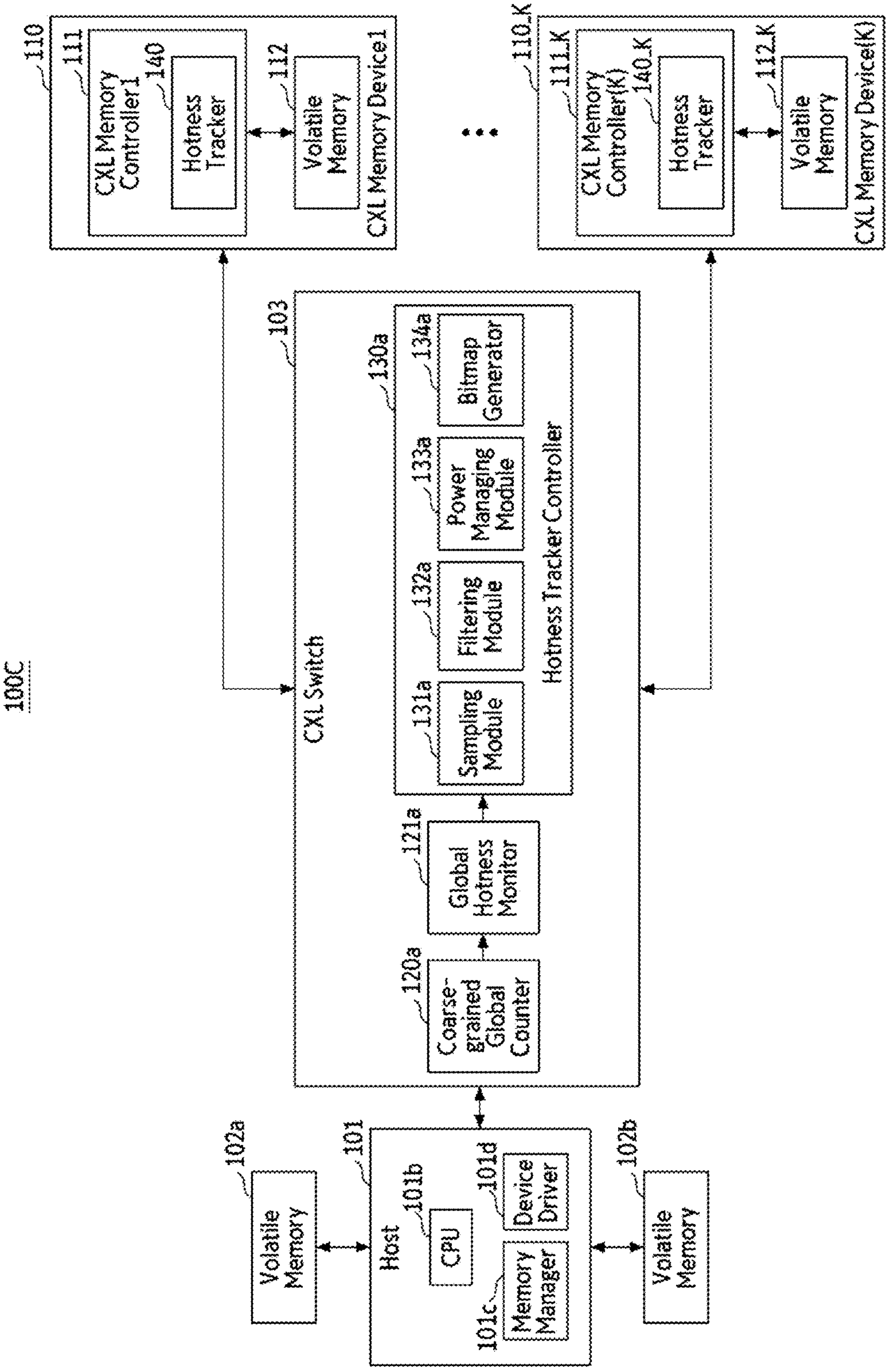
FIG. 24 is a diagram illustrating a memory system according to some embodiments.

FIG. 24 is a diagram illustrating a memory system according to some embodiments.

Referring to FIG. 24, a memory system 100C may include a CXL switch 103, and the CXL switch 103 may include a coarse-grained global counter 120*a*, a global hotness monitor 121*a*, a hotness tracker controller 130*a*, a sampling module 131*a*, a filtering module 132*a*, a power management module 133*a*, and a bitmap generator 134*a*. The memory system 100C may also include a plurality of CXL memory devices 110 through 110_K.

In the memory system 100C, unlike in the memory system 100B illustrated in FIG. 23, the coarse-grained global counter 120*a*, the global hotness monitor 121*a*, the hotness tracker controller 130*a*, the sampling module 131*a*, the filtering module 132*a*, the power management module 133*a*, and the bitmap generator 134*a* may be arranged at the level of the CXL switch 103. The CXL switch 103 may be connected to the CXL memory devices 110 through 110_K. That is, unlike in the memory system 100B of FIG. 23, where the CXL memory devices 110 through 110_K include the coarse-grained global counters 120 through 120_K, respectively, the global hotness monitors 121 through 121_K, respectively, the hotness tracker controllers 130 through 130_K, respectively, the sampling modules 131 through 131_K, respectively, the filtering modules 132 through 132_K, respectively, the power management modules 133 through 133_K, respectively, and the bitmap generators 134 through 134_K, respectively, in the memory system 100C, the hotness tracker controller 130*a*, which controls the hotness trackers 140 through 140_K of the CXL memory devices 110 through 110_K, and the coarse-grained global counter 120*a* and the global hotness monitor 121*a*, which provide information required for the operation of the hotness tracker controller 130*a* and the sampling module 131*a*, the filtering module 132*a*, the power management module 133*a*, and the bitmap generator 134*a* of the hotness tracker controller 130*a*, may be arranged at the level of the CXL switch 103.

Figure 25:
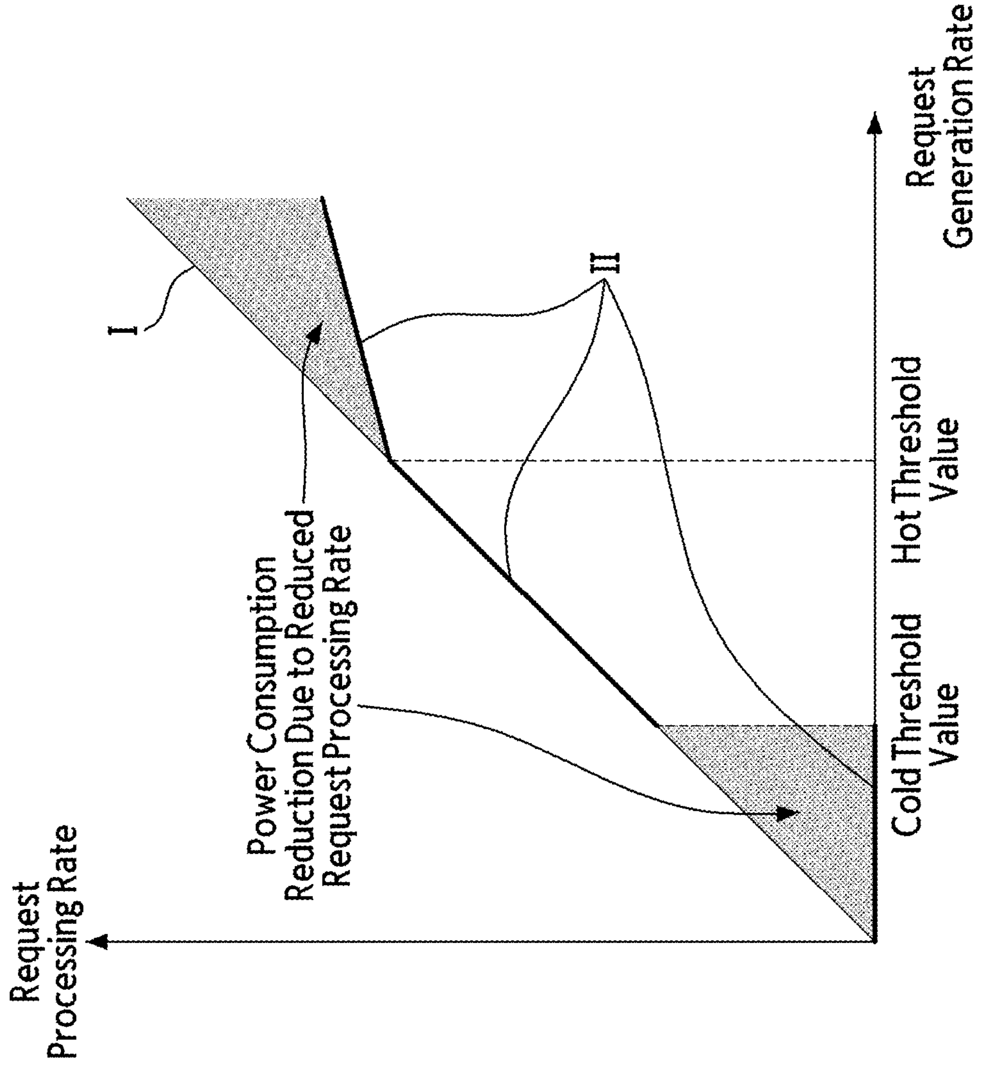
FIG. 25 is a diagram illustrating the effects of a memory device according to some embodiments.

FIG. 25 is a diagram illustrating the effects of a memory device according to some embodiments.

Referring to FIG. 25, graph I shows the relationship between the request generation rate and the request processing rate for the CXL memory device 110 (illustrated in FIG. 5) of the host 101 when the technical concept of the present disclosure is not applied, and graph II shows the same relationship when the technical concept of the present disclosure is applied.

Referring first to graph I, when the technical concept of the present disclosure is not applied, the hotness tracker 140 (illustrated in FIG. 5) processes as many requests as are generated by the host 101 for the CXL memory device 110. Therefore, the power consumption reduction effect of the hotness tracker 140 may not be significant.

When the technical concept of the present disclosure is applied (graph II), if the count value for a specific memory unit measured by the coarse-grained global counter 120 is less than the cold threshold value, the specific memory unit may be classified as a cold unit, and a filtering mechanism may be applied by the filtering module 132. Accordingly, the requests of host 101 for the specific memory unit may be filtered out and not transmitted to the hotness tracker 140. In this case, the request processing rate of the hotness tracker 140 may become "0," thereby reducing the power consumption of the hotness tracker 140.

When the count value for a specific memory unit measured by the coarse-grained global counter 120 is between the cold threshold value and the hot threshold value, the hotness tracker 140 may process as many requests as are generated by the host 101 for the specific memory unit.

When the count value for a specific memory unit measured by the coarse-grained global counter 120 exceeds the hot threshold value, the specific memory unit may be classified as a hot unit, and a sampling mechanism may be applied by the sampling module 131. Accordingly, the requests for the specific memory unit may be sampled, and the sampling module 131 may transmit only some of the requests received for the specific memory unit during an epoch to the hotness tracker 140. In this case, the request processing rate of the hotness tracker 140 may decrease compared to when the technical concept of the present disclosure is not applied (graph I), thereby reducing the power consumption of the hotness tracker 140.

Meanwhile, the hotness tracker 140 may count the number of requests made by the host 101 for each memory region of a specific logical memory device, determine the hotness of the data stored in each memory region, and migrate data determined to be hot to the higher-tier memory of host 101 (e.g., the volatile memories 102*a* and 102*b* illustrated in FIG. 1). In some embodiments, due to hardware limitations, a counter may not be installed to count the number of requests for each memory region. Instead, a probabilistic algorithm may be used to estimate the number of requests made by the host 101 for each memory region.

The error rate of the probabilistic algorithm may increase as the volume of requests processed by the hotness tracker 140 increases. However, when the technical concept of the present disclosure is applied (graph II), the overall request processing rate of the hotness tracker 140 may decrease compared to when the technical concept is not applied (graph I). This may improve the accuracy of the probabilistic algorithm, thereby enhancing the functionality of the hotness tracker 140.

Figure 26:
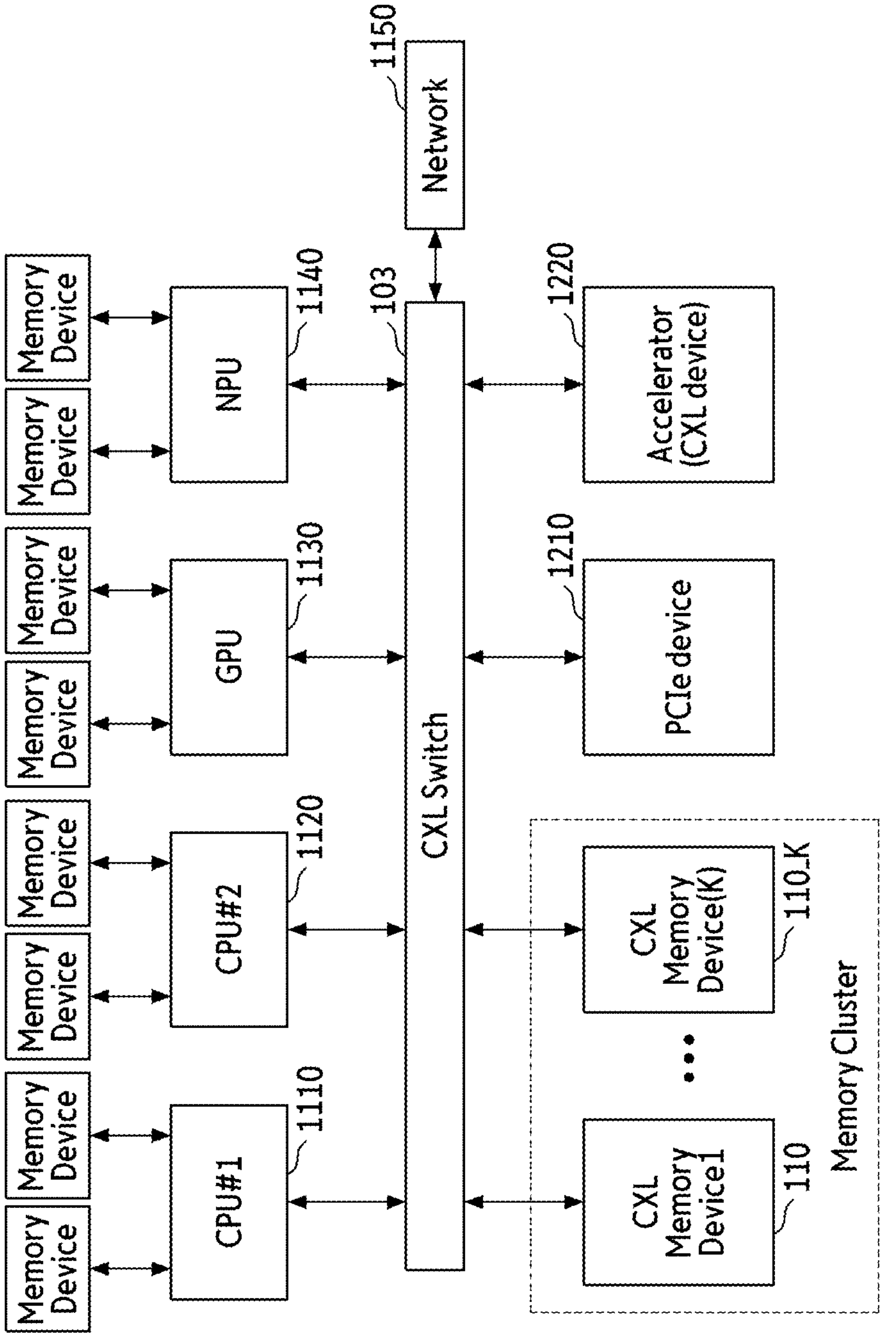
FIG. 26 is a diagram illustrating a computing system according to some embodiments.

FIG. 26 is a diagram illustrating a computing system according to some embodiments.

Referring to FIG. 26, a computing system 1000 may include a first CPU 1110, a second CPU 1120, a GPU 1130, an NPU 1140, a CXL switch 103, a memory cluster, a PCIe device 1210, and an accelerator (CXL device) 1220. The memory cluster may include a plurality of CXL memory devices 110 through 110_K.

The first CPU 1110, the second CPU 1120, the GPU 1130, the NPU 1140, the CXL memory devices 110 through 110_K, the PCIe device 1210, and the accelerator 1220 may be commonly connected to the CXL switch 103, and may communicate with one another through the CXL switch 103.

In some embodiments, each of the first CPU 1110, the second CPU 1120, the GPU 1130, and the NPU 1140 may correspond to the host 101 described with reference to FIG. 1, and may be directly connected to individual memory devices (e.g., the volatile memories 102*a* and 102*b* illustrated in FIG. 1).

In some embodiments, the CXL switch 103 may be connected to the PCIe device 1210 or the accelerator 1220 configured to support various functionalities. The PCIe device 1210 or the accelerator 1220 may communicate with the first CPU 1110, the second CPU 1120, the GPU 1130, and the NPU 1140 or access the CXL memory devices 110 through 110_K through the CXL switch 103.

In some embodiments, the CXL switch 103 may be connected to an external network 1150 or fabric and may be configured to communicate with external servers through the external network 1150 or fabric.

Figure 27:
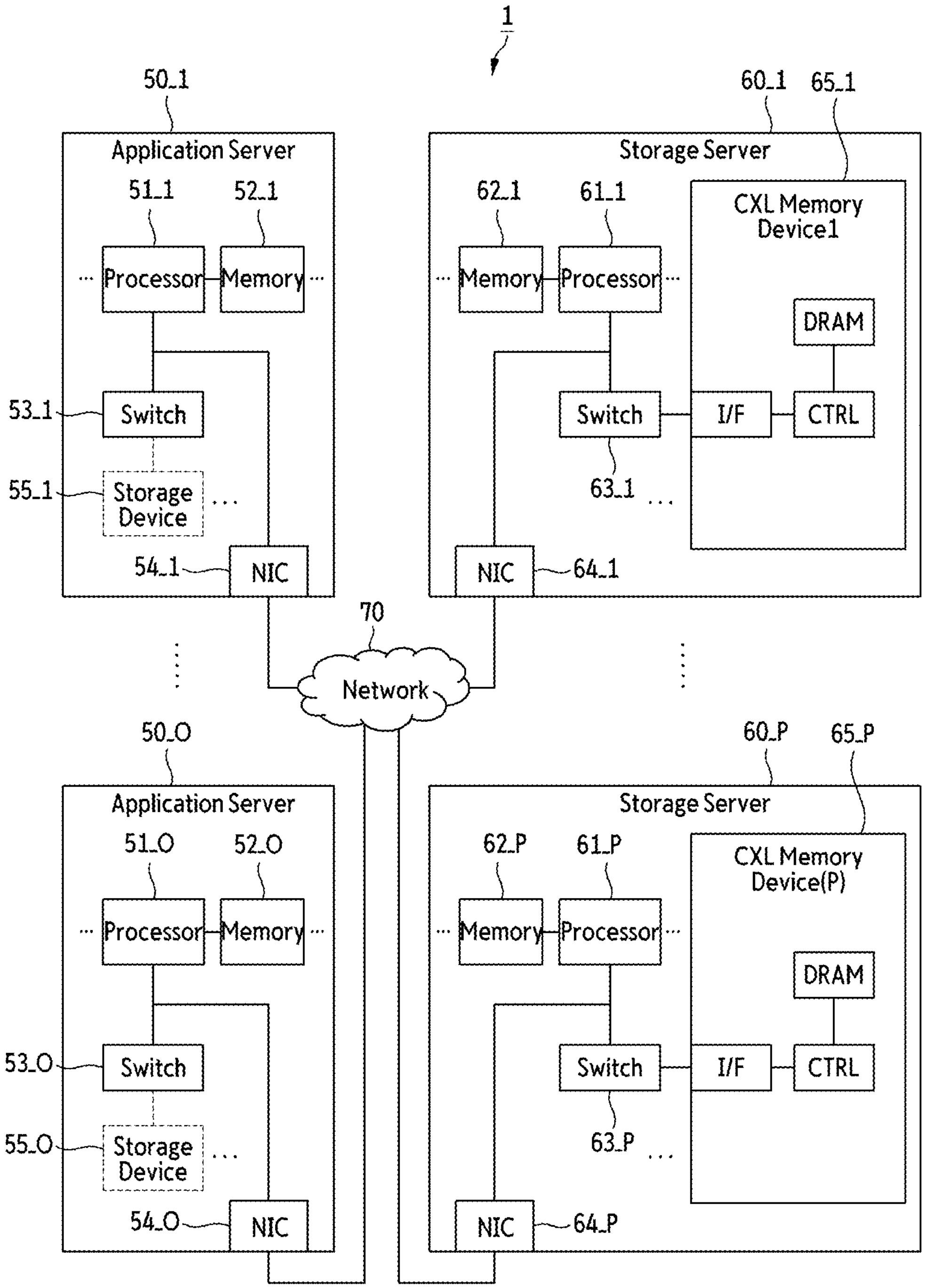
FIG. 27 is an example diagram illustrating a data center to which a computing system according to some embodiments is applied.

FIG. 27 is an example diagram illustrating a data center to which a computing system according to some embodiments is applied.

The computing system 1000 of FIG. 26 may be included in a data center 1 as an application server and/or a storage server. Additionally, the memory systems according to some embodiments may be applied to each application server and/or storage server.

The data center 1 may collect various data and provide services and may also be referred to as a data storage center. For example, the data center 1 may be a system for operating search engines and databases or a computing system used by enterprises such as banks or government agencies. As illustrated in FIG. 27, the data center 1 may include application servers 50_1 through 50_O and storage servers 60_1 through 60_P (where O and P are integers greater than 1). The numbers O and P of the application servers 50_1 through 50_O and the storage servers 60_1 through 60_P may vary from embodiment to embodiment and may differ from each other in some embodiments.

The application servers 50_1 through 50_O may include processors 51_1 through 51_O, respectively, memories 52_1 through 52_O, respectively, switches 53_1 through 53_0, respectively, network interface controllers (NICs) 54_1 through 54_O, respectively, and/or storage devices 55_1 through 55_O, respectively. The processors 51_1 through 51_O may control the overall operation of the application servers 50_1 through 50_O and may access the memories 52_1 through 52_O to execute instructions and/or data loaded in the memories 52_1 through 52_O. The memories 52_1 through 52_O may include, as non-limiting examples, Double Data Rate Synchronous DRAMs (DDR SDRAMs), high bandwidth memories (HBMs), hybrid memory cubes (HMCs), dual in-line memory modules (DIMMs), Optane DIMMs, or non-volatile DIMMs (NVDIMMs).

The numbers of processors and memories included in the application servers 50_1 through 50_O may vary. In some embodiments, the processors 51_1 through 51_O and the memories 52_1 through 52_O may provide processor-memory pairs. In other embodiments, the numbers of processors 51_1 through 51_O and memories 52_1 through 52_O may differ. The processors 51_1 through 51_O may include single-core or multi-core processors. In some embodiments, as illustrated by the dotted lines in FIG. 27, the storage devices 55_1 through 55_O may be omitted from the application servers 50_1 through 50_O. The number of storage devices 55_1 through 55_O included in the application servers 50_1 through 50_O may also vary from embodiment to embodiment. The processors 51_1 through 51_O, memories 52_1 through 52_O, switches 53_1 through 53_O, NICs 54_1 through 54_O, and/or storage devices 55_1 through 55_O may communicate with one another through the CXL interface and CXL switch described earlier with reference to the drawings.

The storage servers 60_1 through 60_P may include processors 61_1 through 61_P, respectively, memories 62_1 through 62_P, respectively, switches 63_1 through 63_P, respectively, NICs 64_1 through 64_P, respectively, and/or memory devices 65_1 through 65_P, respectively. The processors 61_1 through 61_P and the memories 62_1 through 62_P may operate similarly to the processors 51_1 through 51_O and the memories 52_1 through 52_0 of the application servers 50_1 through 50_O described earlier.

The application servers 50_1 through 50_O and the storage servers 60_1 through 60_P may communicate with one another through a network 70. In some embodiments, the network 70 may be implemented using Fibre Channel (FC) or Ethernet. FC may serve as a medium for relatively high-speed data transmission, and high-performance/high-availability optical switches may be used. Depending on the access method of the network 70, the storage servers 60_1 through 60_P may be provided as file storages, block storages, or object storages.

In some embodiments, the network 70 may be a storage-dedicated network such as a storage area network (SAN). For example, the SAN may use an FC network and be implemented as an FC-SAN according to the Fibre Channel Protocol (FCP). In some embodiments, the SAN may use a TCP/IP network and be implemented as an IP-SAN according to the Small Computer System Interface (SCSI) over TCP/IP or Internet SCSI (iSCSI) protocol. In other embodiments, the network 70 may be a general-purpose network such as a TCP/IP network. For example, the network 70 may be implemented according to protocols such as Fibre Channel over Ethernet (FCOE), Network Attached Storage (NAS), or Non-Volatile Memory Express (NVMe) over Fabrics (NVMe-oF).

The following description mainly focuses on the application server 50_1 and the storage server 60_1, but it should be noted that the descriptions of the application server 50_1 and the storage server 60_1 also apply to other application servers (e.g., 50_O) and other storage servers (e.g., 60_P).

The application server 50_1 may store data requested by a user or client through the network 70 in one of the storage servers 60_1 through 60_P. Additionally, the application server 50_1 may obtain data requested for reading by the user or client from one of the storage servers 60_1 through 60_P through the network 70. For example, the application server 50_1 may be implemented as a web server or a Database Management System (DBMS).

The application server 50_1 may access the memory 52_O and/or the storage device 55_O included in the application server 50_O through the network 70. Additionally, the application server 50_1 may access the memories 62_1 through 62_P and/or the memory devices 65_1 through 65_P included in the storage servers 60_1 through 60_P through the network 70. Accordingly, the application server 50_1 may perform various operations on the data stored in the application servers 50_1 through 50_O and/or the storage servers 60_1 through 60_P. For example, the application server 50_1 may execute commands to move or copy data between the application servers 50_1 through 50_0 and/or the storage servers 60_1 through 60_P. In this case, data may be moved from the memory devices 65_1 through 65_P of the storage servers 60_1 through 60_P to the memories 62_1 through 62_P of the storage servers 60_1 through 60_P, or directly to the memories 52_1 through 52_O of the application servers 50_1 through 50_O. In some embodiments, the data transferred over the network 70 may be encrypted for security or privacy.

In the storage server 60_1, an interface I/F may provide a physical connection between the processor 61_1 and a controller CTRL and between the NIC 64_1 and the controller CTRL. For example, the interface I/F may be implemented as a direct attached storage (DAS) method that directly connects the memory device 65_1 via a dedicated cable. In some embodiments, the interface I/F may be implemented using various other interface methods such as Advanced Technology Attachment (ATA), Serial ATA (SATA), External SATA (e-SATA), SCSI, Serial Attached SCSI (SAS), Peripheral Component Interconnect (PCI), PCI express (PCIe), NVMe, IEEE 1394, Universal Serial Bus (USB), Secure Digital (SD) card, Multi-Media Card (MMC), Embedded Multi-Media Card (eMMC), Universal Flash Storage (UFS), embedded UFS (eUFS), and Compact Flash (CF) card interfaces.

In the storage server 60_1, the switch 63_1 may selectively connect the processor 61_1 to the memory device 65_1 or the NIC 64_1 to the memory device 65_1 under the control of the processor 61_1.

In some embodiments, the NIC 64_1 may include a network interface card, network adapter, etc. The NIC 64_1 may be connected to the network 70 through a wired interface, wireless interface, Bluetooth interface, optical interface, etc. The NIC 64_1 may include an internal memory, a digital signal processor (DSP), and a host bus interface, and may be connected to the processor 61_1 and/or the switch 63_1 through the host bus interface. In some embodiments, the NIC 64_1 may be integrated with at least one of the processor 61_1, the switch 63_1, or the memory device 65_1.

In the application servers 50_1 through 50_0 or the storage servers 60_1 through 60_P, the processors 51_1 through 51_O or 61_1 through 61_P may send commands to the storage devices 55_1 through 55_0, the memory devices 65_1 through 65_P, or the memories 52_1 through 52_O or 62_1 through 62_P to program or read data. In this case, the data may be error-corrected using an Error Correction Code (ECC) engine. The data may also be processed through Data Bus Inversion (DBI) or Data Masking (DM) and include Cyclic Redundancy Code (CRC) information. Additionally, the data may be encrypted for security or privacy.

The storage devices 55_1 through 55_O and the memory devices 65_1 through 65_P may respond to read commands received from the processors 51_1 through 51_O or 61_1 through 61_P by sending control signals and command/address signals to NVM devices (e.g., NAND flash memory devices) or volatile memory devices. When data is read from the NVM devices or volatile memory devices, read enable signals may be input as data output control signals, enabling data to be output via DQ buses. The read enable signals may also be used to generate data strobe signals. The command/address signals may be latched on the rising or falling edges of write enable signals.

The controller CTRL may generally control the operation of the memory device 65_1. In some embodiments, the controller CTRL may include a static random-access memory (SRAM). The controller CTRL may write data to or read data from the NVM devices or volatile memory devices in response to write or read commands. For example, the write and/or read commands may be generated based on requests from a host, such as the processor 61_1 in the storage server 60_1, the processor 61_P in the storage server 60_P, or the processors 51_1 through 51_O in the application servers 50_1 through 50_O. A buffer BUF may temporarily store (or buffer) data to be written to or read from the NVM devices or volatile memory devices. In some embodiments, the buffer BUF may include a DRAM. Additionally, the buffer BUF may store metadata, and the metadata may refer to data generated by the controller CTRL to manage user data or the NVM devices. The memory device 65_1 may include a Secure Element (SE) for security or privacy.

Although some embodiments of the present disclosure have been described above with reference to the accompanying diagrams, the present disclosure may not be limited to some embodiments and may be implemented in various different forms. Those of ordinary skill in the technical field to which the present disclosure belongs will be able to appreciate that the present disclosure may be implemented in other specific forms without changing the technical idea or features of the present disclosure. Therefore, it should be understood that some embodiments as described above are not restrictive but illustrative in all respects.

What is claimed is:

1. A memory device comprising:

a first volatile memory including a first logical memory device; and a Compute Express Link CXL memory controller configured to control operations of the first volatile memory and receive requests for the first volatile memory from a host through a CXL interface including a CXL switch, wherein the first logical memory device includes a plurality of segments that are physically separated from one another, wherein at least two of the plurality of segments form a single memory unit among a plurality of memory units of the first logical memory device, and wherein the CXL memory controller comprises:

a coarse-grained global counter configured to count a number of the requests received for each of the plurality of memory units of the first logical memory device and store count values respectively associated with the number of the requests received for each of the plurality of memory units;

a global hotness monitor configured to determine, based on respective ones of the count values, whether each of the plurality of memory units of the first logical memory device is a hot unit or a cold unit;

a hotness tracker controller configured to generate a first bitmap for each of the plurality of memory units of the first logical memory device based on results of a determination of the global hotness monitor; and a first hotness tracker configured to determine, based on the first bitmap, whether data stored in each of the plurality of segments included in the first logical memory device is hot.

2. The memory device of claim 1, wherein in response to a determination that first data stored in a first segment among the plurality of segments is hot based on the first bitmap, the first hotness tracker is configured to store the first data in a second volatile memory of the host, and wherein the host and the second volatile memory are not connected to each other through the CXL interface.

3. The memory device of claim 2, wherein the host and the second volatile memory are configured to communicate with each other through a Double Data Rate (DDR) interface.

4. The memory device of claim 1, wherein the hotness tracker controller comprises a power management module configured to manage power supplied to the first hotness tracker, and wherein in response to the global hotness monitor determining that all of the plurality of memory units included in the first logical memory device are cold units, the power management module is configured to cut off the power supplied to the first hotness tracker.

5. The memory device of claim 1, wherein the hotness tracker controller comprises a filtering module, and wherein in response to a first memory unit among the plurality of memory units included in the first logical memory device being determined to be a cold unit, the filtering module is configured to clear bits in the first bitmap corresponding to ones of the plurality of segments included in the first memory unit.

6. The memory device of claim 5, wherein in response to the bits in the first bitmap corresponding to the ones of the plurality of segments included in the first memory unit being cleared, the first hotness tracker is configured to not determine whether the data stored in each of the plurality of segments included in the first memory unit is hot.

7. The memory device of claim 1, wherein the plurality of memory units includes a first memory unit and a second memory unit having different physical addresses, wherein the global hotness monitor is configured to determine the first memory unit as a cold unit if a first count value of the count values for the first memory unit is less than a cold threshold value, and is configured to determine the second memory unit as a hot unit if a second count value of the count values for the second memory unit exceeds a hot threshold value, and wherein the cold threshold value and the hot threshold value are preset by the host.

8. The memory device of claim 1, wherein the plurality of memory units includes a first memory unit that includes a first segment and a second segment having different physical addresses, wherein the first hotness tracker is configured to determine data stored in the first and second segments as hot if requests for the first memory unit exceed a hot threshold value per epoch, wherein the hotness tracker controller includes a sampling module, and wherein the sampling module is configured to sample some of the requests for the first memory unit during a subsequent epoch and transmits the requests that have been sampled to the first hotness tracker in response to the global hotness monitor determining the first memory unit as a hot unit.

9. The memory device of claim 8, wherein the hot threshold value is preset by the host.

10. The memory device of claim 1, wherein the plurality of memory units includes a first memory unit determined to be a hot unit by the global hotness monitor, and wherein the hotness tracker controller is configured to transmit requests received for the first memory unit to the first hotness tracker.

11. The memory device of claim 10, wherein the first hotness tracker is configured to count a number of the received requests and is configured to determine whether data stored in each of the plurality of segments included in the first memory unit is hot.

12. The memory device of claim 10, wherein the first memory unit includes a first segment and a second segment of the plurality of segments, wherein the hotness tracker controller includes a sampling module, and wherein the sampling module is configured to transmit some of requests received per epoch for the first memory unit to the first hotness tracker in response to a number of the requests that were received exceeding a hot threshold value set by the host.

13. The memory device of claim 1, wherein the first volatile memory further comprises a second logical memory device, wherein the second logical memory device includes ones of the plurality of segments that are physically separated from one another, wherein at least two of the plurality of segments included in the second logical memory device form a single memory unit among a plurality of memory units of the second logical memory device, wherein the coarse-grained global counter is configured to count a number of the requests received for each of the plurality of memory units of the second logical memory device and store count values respectively associated with the number of the requests received for each memory unit of the second logical memory device, wherein the global hotness monitor is configured to determine, based on the count values for the second logical memory device, whether each of the plurality of memory units of the second logical memory device is a hot unit or a cold unit, wherein the hotness tracker controller is configured to generate a second bitmap for each of the plurality of memory units of the second logical memory device based on results of a determination of the global hotness monitor for the second logical memory device, and wherein the CXL memory controller further includes a second hotness tracker configured to determine, based on the second bitmap, whether data stored in each of the plurality of segments included in the second logical memory device is hot.

14. A memory system comprising:

a host;

a first Compute Express Link CXL memory device including a first volatile memory that includes a first logical memory device, and a first CXL memory controller that is configured to control operations of the first volatile memory; and a CXL switch configured to provide an interface between the host and the first CXL memory device, wherein the host is configured to transmit first requests for the first volatile memory through the CXL switch, wherein the first logical memory device includes a plurality of segments that are physically separated from one another, wherein at least two of the plurality of segments form a single memory unit among a plurality of memory units of the first logical memory device, wherein the CXL switch comprises:

a coarse-grained global counter configured to count a number of the first requests received for each of the plurality of memory units of the first logical memory device and store count values respectively associated with the number of the first requests received for each of the plurality of memory units;

a global hotness monitor configured to determine, based on respective ones of the count values, whether each of the plurality of memory units of the first logical memory device is a hot unit or a cold unit; and a hotness tracker controller configured to generate a first bitmap for each of the plurality of memory units of the first logical memory device based on results of the determination of the global hotness monitor, and wherein the first CXL memory controller is configured to determine, based on the first bitmap, whether data stored in each of the plurality of segments included in the first logical memory device is hot, using a first hotness tracker.

15. The memory system of claim 14, wherein the memory system further comprises:

a second CXL memory device including a second volatile memory that includes a second logical memory device; and a second CXL memory controller configured to control operations of the second volatile memory, wherein the CXL switch is further configured to provide an interface between the host and the second CXL memory device, wherein the host is configured to transmit second requests for the second volatile memory through the CXL switch, wherein the second logical memory device includes a plurality of segments that are physically separated from one another, wherein at least two of the plurality of segments included in the second logical memory device form a single memory unit among a plurality of memory units of the second logical memory device, wherein the coarse-grained global counter is configured to count a number of the second requests received for each of the plurality of memory units of the second logical memory device and store count values respectively associated with the number of the second requests received for each of the plurality of memory units of the second logical memory device, wherein the global hotness monitor is configured to determine, based on respective ones of the count values for the second logical memory device, whether each of the plurality of memory units of the second logical memory device is a hot unit or a cold unit, wherein the hotness tracker controller is configured to generate a second bitmap for each of the plurality of memory units of the second logical memory device based on results of the determination of the global hotness monitor for the second logical memory device, and wherein the second CXL memory controller is configured to determine, based on the second bitmap, whether data stored in each of the plurality of segments included in the second logical memory device is hot, using a second hotness tracker.

16. The memory system of claim 15, wherein the second hotness tracker is configured to determine, based on the second bitmap, that first data stored in a first segment among the plurality of segments included in the second logical memory device is hot, and is configured to store the first data in a third volatile memory of the host, and wherein the host and the third volatile memory are configured to communicate with each other through a Double Data Rate (DDR) interface.

17. The memory system of claim 15, wherein the first logical memory device includes a first memory unit determined to be a hot unit by the global hotness monitor, wherein the second logical memory device includes a second memory unit determined to be a hot unit by the global hotness monitor, and wherein the hotness tracker controller is configured to transmit first requests received for the first memory unit to the first hotness tracker and second requests received for the second memory unit to the second hotness tracker.

18. An operating method of a memory system, comprising:

providing a memory system including a host, a volatile memory that includes a logical memory device, a Compute Express Link CXL memory controller that is configured to control operations of the volatile memory, and a CXL switch that is configured to provide an interface between the host and the CXL memory controller;

transmitting, by the host, requests for the volatile memory to the CXL memory controller through the CXL switch;

counting, by a coarse-grained global counter, a number of the requests received for each of a plurality of memory units of the logical memory device and storing count values respectively associated with the number of the requests received for each of the plurality of memory units;

determining, by a global hotness monitor, whether each of the plurality of memory units of the logical memory device is a hot unit or a cold unit based on respective ones the count values;

generating, by a hotness tracker controller, a bitmap for each of the plurality of memory units of the logical memory device based on results of the determination of the global hotness monitor; and determining, by a hotness tracker, whether data stored in each of a plurality of segments included in the logical memory device is hot based on the bitmap, wherein each of the plurality of memory units includes at least two of the plurality of segments.

19. The operating method of claim 18, wherein the coarse-grained global counter, the global hotness monitor, and the hotness tracker controller are in the CXL switch, and wherein the hotness tracker is inside a memory device that includes the CXL memory controller and the volatile memory.

20. The operating method of claim 18, wherein the CXL memory controller and the volatile memory are inside a memory device, and wherein the memory device includes the coarse-grained global counter, the global hotness monitor, the hotness tracker controller, and the hotness tracker.

* * * * *